United States Patent
Pantea et al.

(10) Patent No.: US 12,358,020 B1
(45) Date of Patent: Jul. 15, 2025

(54) SIMPLE BESSEL-LIKE COLLIMATED SOUND BEAM GENERATOR

(71) Applicant: LOS ALAMOS NATIONAL SECURITY, LLC, Los Alamos, NM (US)

(72) Inventors: Cristian Pantea, Los Alamos, NM (US); Dipen N. Sinha, Los Alamos, NM (US); Vamshi Krishna Chillara, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 255 days.

(21) Appl. No.: 15/720,475

(22) Filed: Sep. 29, 2017

Related U.S. Application Data

(60) Provisional application No. 62/401,677, filed on Sep. 29, 2016.

(51) Int. Cl.
  *B06B 1/06* (2006.01)
  *C01G 25/00* (2006.01)

(52) U.S. Cl.
  CPC .......... *B06B 1/0651* (2013.01); *C01G 25/006* (2013.01); *C01P 2006/40* (2013.01)

(58) Field of Classification Search
  None
  See application file for complete search history.

(56) References Cited

U.S. PATENT DOCUMENTS

| | | | | | |
|---|---|---|---|---|---|
| 2,427,062 | A | * | 9/1947 | Massa | H04R 17/00 367/155 |
| 3,051,927 | A | * | 8/1962 | Mazzagatti | G01V 1/523 367/157 |
| 3,268,855 | A | * | 8/1966 | Hagey | B06B 1/0648 310/334 |
| 4,417,480 | A | * | 11/1983 | Zacharias, Jr. | G10K 11/002 310/327 |
| 4,431,936 | A | * | 2/1984 | Fu | G01F 1/662 310/335 |
| 4,443,733 | A | * | 4/1984 | Samodovitz | G10K 11/32 310/335 |
| 4,446,395 | A | * | 5/1984 | Hadjicostis | G10K 11/002 310/327 |

(Continued)

OTHER PUBLICATIONS

Calás, H., et al. "A model for radial modes in piezoelectric disk exhibiting Bessel polarizations." Applied Physics Letters 91.26 (2007): 263509. (Year: 2007).*

(Continued)

*Primary Examiner* — Isam A Alsomiri
*Assistant Examiner* — Jonathan D Armstrong
(74) *Attorney, Agent, or Firm* — Womble Bond Dickinson (US) LLP

(57) ABSTRACT

A method of and system for producing a Bessel-like collimated sound beam frequencies below 1 MHz, and a device for sound (acoustic) imaging. A flat disk piezoelectric transducer having a large diameter/thickness ratio may be configured to exhibit radial vibration modes in the desired frequency range according to one or more parameters, including the diameter/thickness ratio, materials, electrode coverage, etc. The transducer may be driven by a waveform generator at one or more radial mode excitation frequencies.

16 Claims, 25 Drawing Sheets

(56) References Cited

U.S. PATENT DOCUMENTS

| | | | | |
|---|---|---|---|---|
| 4,784,147 | A * | 11/1988 | Moshfeghi | B06B 1/0622 600/425 |
| 4,859,897 | A * | 8/1989 | Massa | B06B 1/0655 310/334 |
| 4,868,446 | A * | 9/1989 | Kumada | H02N 2/002 310/323.02 |
| 4,961,252 | A * | 10/1990 | Hsu | G01N 29/2475 29/25.35 |
| 5,305,752 | A * | 4/1994 | Spivey | A61B 8/463 600/448 |
| 5,357,964 | A * | 10/1994 | Spivey | A61B 8/06 600/455 |
| 5,452,267 | A * | 9/1995 | Spevak | G10K 13/00 310/328 |
| 6,011,855 | A * | 1/2000 | Selfridge | G10K 15/02 310/324 |
| 6,022,318 | A * | 2/2000 | Koblanski | A61B 8/0875 600/449 |
| 6,140,740 | A * | 10/2000 | Porat | A61B 5/0031 310/322 |
| 6,198,965 | B1 * | 3/2001 | Penner | A61B 5/0535 600/547 |
| 6,216,538 | B1 * | 4/2001 | Yasuda | B01D 21/283 210/748.05 |
| 7,376,236 | B1 * | 5/2008 | Norris | H04R 17/00 381/111 |
| 7,809,219 | B2 * | 10/2010 | Kilic | G01H 9/004 356/480 |
| 7,881,565 | B2 * | 2/2011 | Kilic | G01H 9/004 385/12 |
| 8,249,400 | B2 * | 8/2012 | Kilic | G01H 9/004 385/11 |
| 10,234,696 | B2 * | 3/2019 | Popovich | G02B 27/48 |
| 10,295,845 | B2 * | 5/2019 | Kliner | G02B 6/14 |
| 2001/0051766 | A1* | 12/2001 | Gazdzinski | A61B 1/00156 600/309 |
| 2003/0059068 | A1* | 3/2003 | Bank | G06F 1/1616 381/152 |
| 2004/0052387 | A1* | 3/2004 | Norris | H04R 1/403 381/190 |
| 2004/0124372 | A1* | 7/2004 | Gil | G03F 7/70275 250/492.2 |
| 2005/0001517 | A1* | 1/2005 | Yogeswaren | G10K 11/002 310/334 |
| 2005/0244016 | A1* | 11/2005 | Norris | H04B 5/0006 381/77 |
| 2006/0094988 | A1* | 5/2006 | Tosaya | A61H 23/0245 601/2 |
| 2007/0081165 | A1* | 4/2007 | Kilic | G01H 9/00 356/477 |
| 2008/0226217 | A1* | 9/2008 | Kilic | G01H 9/004 385/12 |
| 2009/0268271 | A1* | 10/2009 | Reynolds | G02B 26/002 359/263 |
| 2010/0231092 | A1* | 9/2010 | Andle | H03H 9/177 310/333 |
| 2011/0304723 | A1* | 12/2011 | Betzig | G02B 21/002 348/79 |
| 2013/0063805 | A1* | 3/2013 | Arnold | G02B 3/14 359/311 |
| 2014/0225476 | A1* | 8/2014 | Degertekin | B06B 1/0292 310/309 |
| 2016/0041286 | A1* | 2/2016 | Sinha | G01F 1/668 73/152.32 |
| 2017/0131242 | A1* | 5/2017 | Kannajosyula | G01N 29/262 |
| 2017/0209900 | A1* | 7/2017 | Lipkens | B01D 17/02 |
| 2017/0246662 | A1* | 8/2017 | Kidwell, Jr. | A61B 8/4494 |
| 2018/0068868 | A1* | 3/2018 | Jaramillo | C03C 15/00 |
| 2018/0188526 | A1* | 7/2018 | Li | B60S 1/56 |
| 2019/0094803 | A1* | 3/2019 | Futterer | G03H 1/0402 |

OTHER PUBLICATIONS

Chillara, Vamshi Krishna, Cristian Pantea, and Dipen N. Sinha. "Coupled electromechanical modeling of piezoelectric disc transducers for low-frequency ultrasonic collimated beam generation." Health Monitoring of Structural and Biological Systems 2017. vol. 10170. International Society for Optics (Year: 2017).*

Chillara, Vamshi Krishna, Cristian Pantea, and Dipen N. Sinha. "Low-frequency ultrasonic collimated beam generation from piezoelectric discs." Proceedings of Meetings on Acoustics 6ICU. vol. 32. No. 1. Acoustical Society of America, 2017. (Year: 2017).*

Chillara, Vamshi Krishna, Cristian Pantea, and Dipen N. Sinha. "Low-frequency ultrasonic Bessel-like collimated beam generation from radial modes of piezoelectric transducers." Applied Physics Letters 110.6 (2017): 064101. (Year: 2017).*

Chillara, Vamshi Krishna, et al. "Collimated acoustic beams from radial modes of piezoelectric disc transducers." AIP Conference Proceedings. vol. 2102. No. 1. AIP Publishing LLC, 2019. (Year: 2019).*

Dekker, Don L., Robert L. Piziali, and Eugene Dong Jr. "Effect of boundary conditions on the ultrasonic-beam characteristics of circular disks." The Journal of the Acoustical Society of America 56.1 (1974): 87-93. (Year: 1974).*

Greenspan, Martin. "Piston radiator: Some extensions of the theory." The Journal of the Acoustical Society of America 65.3 (1979): 608-621. (Year: 1979).*

He, Cheng, and Alex E. Hay. "Near-field characteristics of circular piston radiators with simple support." The Journal of the Acoustical Society of America 94.1 (1993): 554-561. (Year: 1993).*

Kelly, James F., and Robert J. McGough. "An annular superposition integral for axisymmetric radiators." The Journal of the Acoustical Society of America 121.2 (2007): 759-765. (Year: 2007).*

Mitri, F. G. "Near-field acoustic resonance scattering of a finite bessel beam by an elastic sphere." IEEE Transactions on Ultrasonics, Ferroelectrics, and Frequency Control 61.4 (2014): 696-704. (Year: 2014).*

Kim, Dae Jong, Se Hwan Oh, and Jin Oh Kim. "Measurements of radial in-plane vibration characteristics of piezoelectric disk transducers." 한국소음진동공학회논문집 25.1 (2015): 13-23. (Year: 2015).*

Piao, Chunguang, Dae Jong Kim, and Jin Oh Kim. "Radial-mode vibration characteristics of piezoelectric hollow-disc transducers." 21st International Congress on Sound and Vibration 2014, ICSV 2014. vol. 4. International Institute of Acoustics and Vibrations, 2014. (Year: 2014).*

Moulin, Emmanuel, et al. "Piezoelectric transducer embedded in a composite plate: application to Lamb wave generation." Journal of Applied Physics 82.5 (1997): 2049-2055. (Year: 1997).*

Lin, Shuyu. "Study on a new type of radial composite piezoelectric ultrasonic transducers in radial vibration." IEEE transactions on ultrasonics, ferroelectrics, and frequency control 53.9 (2006): 1671-1678. (Year: 2006).*

Shuyu, Lin, and Wang Shuaijun. "Radially composite piezoelectric ceramic tubular transducer in radial vibration." IEEE transactions on ultrasonics, ferroelectrics, and frequency control 58.11 (2011): 2492-2498. (Year: 2011).*

Lin, Shuyu, et al. "Radially sandwiched cylindrical piezoelectric transducer." Smart materials and structures 22.1 (2012): 015005. (Year: 2013).*

Magori, Valentin, and Heniz Walker. "Ultrasonic presence sensors with wide range and high local resolution." IEEE transactions on ultrasonics, ferroelectrics, and frequency control 34.2 (1987): 202-211. (Year: 1987).*

Babic, Matjaz. "A 200-KHz ultrasonic transducer coupled to the air with a radiating membrane." IEEE transactions on ultrasonics, ferroelectrics, and frequency control 38.3 (1991): 252-255. (Year: 1991).*

D'Souza, Robert Pierre. "Echolocation: evaluation of finite element analysis of ultrasonic transducers." (1993). (Year: 1993).*

F. G. Mitri, et al. "Characterization of acoustically engineered polymer nanocomposite metamaterials using x-ray microcomputed tomography," Review of Scientific Instruments, vol. 82, No. 034903, 2011, 9 pages.

(56) References Cited

OTHER PUBLICATIONS

J. Durnin, "Exact solutions for nondiffracting beams. I. The scalar theory," Optical Society of America, vol. 4, No. 4, Apr. 1987, pp. 651-654.

N. Guo, et al. "The Finite Element Analysis of The Vibration Characteristics of Piezoelectric Discs," Journal of Sound and Vibration, vol. 159(1), 1992, pp. 115-138.

Jian-Yu Lu, et al., "Ultrasonic Nondiffracting Transducer for Medical Imaging," IEEE Transactions on Ultrasonics, Ferroelectrics, and Frequency Control, vol. 17, No. 5, Sep. 1990, pp. 438-447.

* cited by examiner

Related Art

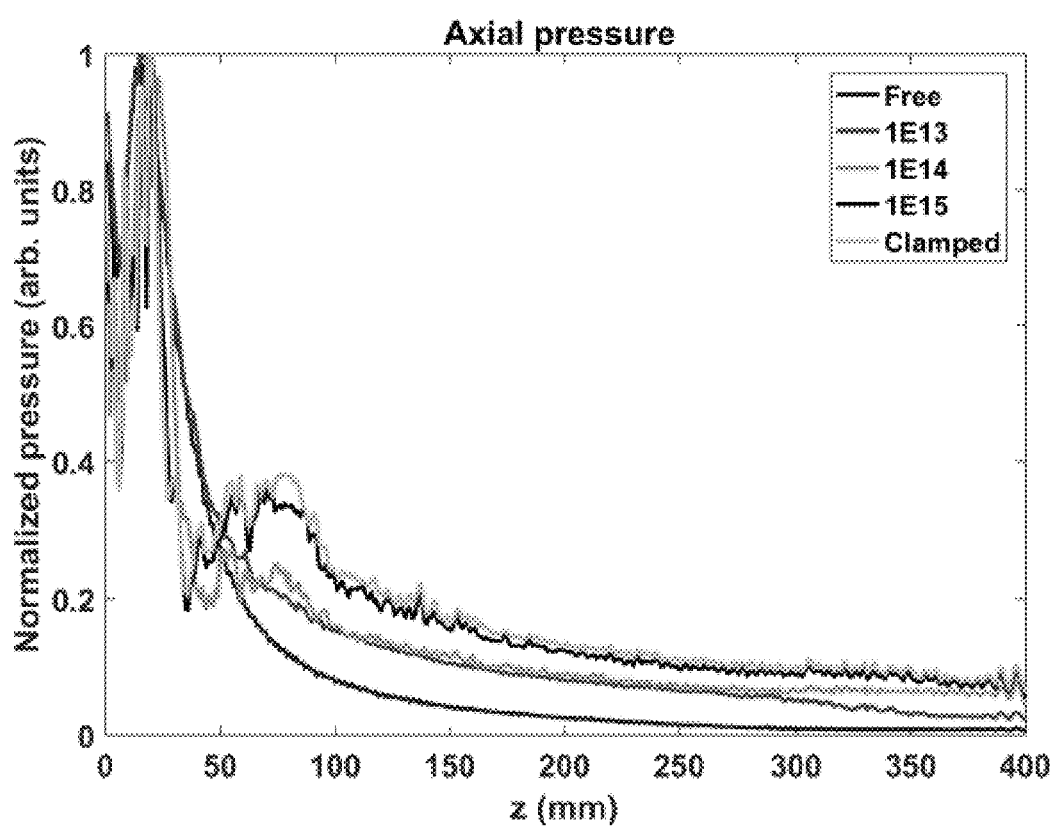

SIMPLE BESSEL-LIKE COLLIMATED SOUND BEAM GENERATOR

CROSS-REFERENCE TO RELATED APPLICATION(S)

This application claims priority to and the benefit of U.S. Provisional Application No. 62/401,677, filed Sep. 29, 2016 and titled "SIMPLE BESSEL-LIKE COLLIMATED SOUND BEAM GENERATOR", the entire content of which is incorporated herein by reference.

STATEMENT REGARDING FEDERALLY SPONSORED RESEARCH OR DEVELOPMENT

The United States government has certain rights in this invention pursuant to Contract No. DE-AC52-06NA25396 between the United States Department of Energy and Los Alamos National Security, LLC for the operation of Los Alamos National Laboratory

BACKGROUND

Collimated (low divergence) ultrasonic (sound, sonic, or acoustic) beams are used to produce high-quality images in many medical and industrial acoustic imaging applications, because they enable good lateral resolution and a large depth of field.

Typical imaging applications use transducers operated at high frequencies in order to produce collimated sound beams. However, high frequency sound beams are unusable for certain imaging applications due to high attenuation and low penetration of the beams in the imaging media. Such applications may include imaging through bone, monitoring drilling in optically opaque but highly attenuating media such as mud, or imaging downhole and around boreholes for cement evaluation or other applications.

The limitations of high frequency sound imaging may be overcome by imaging at lower frequencies (<1 MHz). Low frequency waves have a greater penetrative ability. However, low frequency sound beams generated by related art methods tend to be highly divergent, which results in poor spatial resolution.

The exception is when very large diameter transducers are used; however, these are impractical in most applications. Accordingly, low frequency sound imaging capabilities have been limited.

One approach for producing a highly collimated sound beam at low frequencies uses a so-called "parametric array", which mixes two high frequency waves to generate a difference frequency beam in an acoustic nonlinear medium. Parametric arrays are frequently used for undersea imaging applications (parametric sonars). However, sound beams generated by this approach generally have low intensities.

Accordingly, methods of producing collimated low frequency sound beams have been limited.

SUMMARY

According to embodiments of the present disclosure, a method of producing a Bessel-like collimated sound beam at frequencies below 1 MHz includes: exciting a flat disk piezoelectric transducer at one or more radial mode excitation frequencies to generate a vibration of the flat disk piezoelectric transducer; and producing a Bessel-like collimated sound beam from the vibration of the flat disk piezoelectric transducer.

In some embodiments, the method may further include clamping a perimeter of the flat disk piezoelectric transducer prior to exciting the flat disk piezoelectric transducer.

In some embodiments, the clamping the perimeter of the flat disk piezoelectric transducer may include embedding the flat disk piezoelectric transducer in a cylinder of dissimilar material. The cylinder of dissimilar material may include poly(methyl methacrylate). The cylinder may be glued to the perimeter of the flat disk piezoelectric transducer.

In some embodiments, the one or more radial mode excitation frequencies may be about 79 kHz to about 1 MHz. In some embodiments, the one or more radial mode excitation frequencies may be about 79 kHz to about 182 KHz.

In some embodiments, the one or more radial mode excitation frequencies are spaced apart by about 10 Hz to 300 Hz.

According to embodiments of the present disclosure, a device for sound imaging at frequencies below 1 MHz includes a waveform generator and a piezoelectric transducer including: a circular disk comprising a piezoelectric material; a first electrode on one side of the circular disk; and a second electrode on the opposite side of the circular disk. The piezoelectric transducer may have one or more radial mode excitation frequencies; and the waveform generator may be configured to excite the piezoelectric transducer at the one or more radial mode excitation frequencies.

In some embodiments, the circular disk may have a diameter/thickness ratio of about 5 to about 50.

In some embodiments, the circular disk may be made of lead zirconium titanate.

In some embodiments, the device may further include a clamp attached to a perimeter of the piezoelectric transducer. The clamp may include an enclosure formed of a material different from the piezoelectric material. The piezoelectric transducer may be embedded in the enclosure.

In some embodiments, the device for sound imaging at frequencies below 1 MHz may further include an adhesive layer between the piezoelectric transducer and the enclosure.

In some embodiments, the enclosure may include a metal, an alloy, a glass, a ceramic, a plastic, or a mixture thereof. In some embodiments, the enclosure may include poly (methyl methacrylate). The enclosure may be glued to the perimeter of the piezoelectric transducer.

In some embodiments, the piezoelectric transducer does not include an annual electrode.

According to embodiments of the present disclosure, a system for producing a Bessel-like collimated sound beam at frequencies below 1 MHz includes a means for exciting a flat disk piezoelectric transducer at one or more radial mode excitation frequencies to generate a vibration of the flat disk piezoelectric transducer; and a means for producing a Bessel-like collimated sound beam from the vibration of the flat disk piezoelectric transducer.

BRIEF DESCRIPTION OF THE DRAWINGS

These and other features and advantages of the present invention will be better understood by reference to the following detailed description when considered in conjunction with the accompanying drawings, in which:

FIG. 26 is a graph showing the simulated axial pressure profile, i.e. the pressure produced at the center of the beam as a function of distance from the piezoelectric disk transducer of Example 4 when driven at RM-3 (similar in content to the experimental results shown in FIG. 18) for varying k as in FIGS. 25a and 25b.

DETAILED DESCRIPTION

Figure 1:
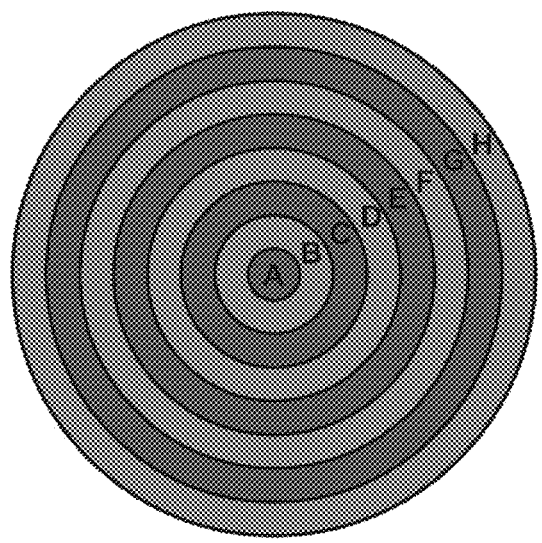
FIG. 1 is a schematic view of a flat disk piezoelectric transducer with annular elements (electrodes) on one side and a common electrode on the opposite side of the disk; according to the related art.

One or more aspects of embodiments of the present disclosure are directed toward a method of producing a Bessel-like collimated (low divergence) sound beam, and a device for producing acoustic images at frequencies below 1 MHz.

As used herein, the term "Bessel-like" or "Bessel" may refer to a waveform with a shape or amplitude function that is similar to, may approximate, or may be modeled as a zeroeth-order Bessel function of the first kind ($J_0$). The terms "sound", "sonic", "acoustic", and like terms used interchangeably herein may refer to transmission of mechanical pressure waves (including audible, sub-audible, ultrasound, and/or the like) through air and liquid media. In addition, as used herein, the term "sound beam" refers to a transmission of field acoustic radiation (e.g., sound waves) in a specific direction. As used herein, the terms "collimated" and "low divergence" as used to describe an sound beam or set of waves indicate that the waves are highly aligned and configured to transmit in a narrow beam or column, without a substantial increase in beam diameter with increasing distance from the origin.

Bessel beams possess several notable properties. For example, a Bessel beam is non-diffractive (diffractionless); in other words, it does not diffract and spread out as it propagates. Bessel beams are also self-healing; that is, the beam can be partially obstructed at a point, but will reconstruct itself further down the beam axis.

A Bessel-like beam can be considered to be a real-life approximation of a true (e.g., ideal) Bessel beam, which would require an infinite amount of energy to exist. Accordingly, a Bessel-like beam may have characteristics approximating those of an ideal Bessel beam. A Bessel-like beam, while not completely diffractionless, exhibits little or substantially no diffraction over a limited distance.

As used herein, the term "substantially" is used as a term of approximation and not as a term of degree, and is intended to account for the inherent deviation and variation in calculated, measured or observed values and qualities. For example, "substantially no diffraction" refers to a wave or beam that exhibits minimal diffraction, or beam diameter spread, over a desired transmission distance (for example, on the scale of about 10 mm to several hundred mms).

Optical Bessel-like beams were first proposed by Durnin (J. Durnin, "Exact solutions for non-diffracting beams. I. The scalar theory," *J. Opt. Soc. Am.*, 4 (4), 651-654, April 1987, the entire content of which is incorporated herein by reference), and have been explored for use in various applications. For example, one application of Bessel-like sound beams is in acoustically creating periodic structures using standing waves in a particle suspension-filled cavity, where the propagation of the beam may be blocked by high particle concentrations (F. G. Mitri, F. H. Garzon and D. N. Sinha, "Characterization of acoustically engineered polymer nanocomposite metamaterials using x-ray microcomputed tomography", *Rev. Sci. Instrum.* 82, 034903, 2011, the entire content of which is incorporated herein by reference). The self-healing properties of Bessel-like beams may enable their use in this situation.

Ultrasonic Bessel-like beams were reported by Lu and Greenleaf (J-Y. Lu and J. F. Greenleaf, "Ultrasonic non-diffracting transducer for medical imaging," *IEEE Trans. Ultrason., Ferroelec., and Freq. Contr.*, 37 (5), 438-447, September 1990, the entire content of which is incorporated herein by reference). Lu and Greenleaf disclosed therein a method of producing Bessel-like beams using a piezoelectric transducer with a flat, finite circular aperture including annular rings at the locations of the zeroes of the Bessel excitation function (e.g., at radii x for which f(x)=amplitude (A)=0). Each ring acts as an independent electrode and can be individually excited at a different voltage to adjust the amplitude of the wave emitted by each electrode. According to this principle, Lu and Greenleaf made a 2.5 MHz, 50 mm diameter, 10 ring Bessel transducer, and adjusted the amplitude of the wave emitted by each ring to be equal to the peak of the respective Bessel lobe.

Figure 2:
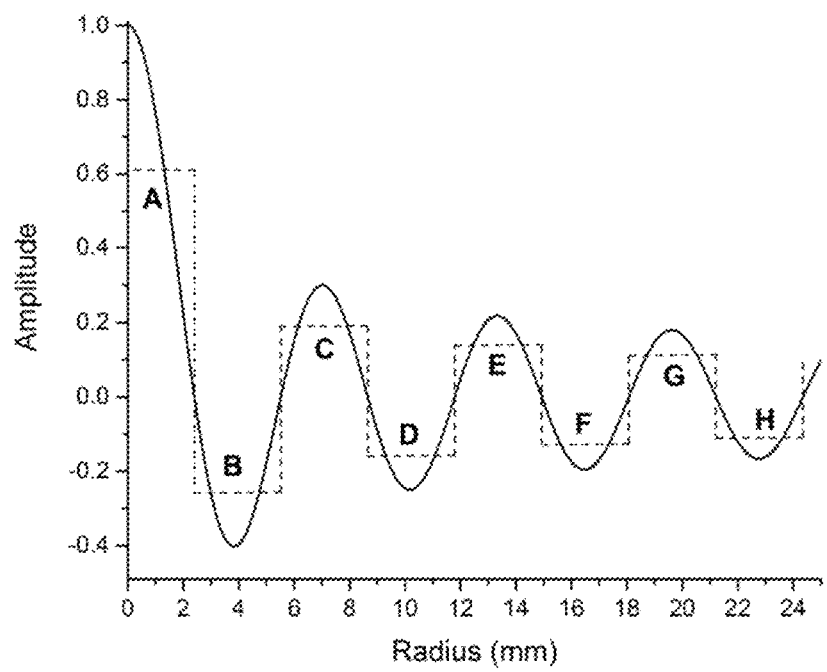
FIG. 2 is a graph of wave amplitude vs radial distance (solid line) and annular electrode thickness (dashed line) from the center of the flat piezoelectric disk transducer of FIG. 1 upon excitation of the annular elements to produce a Bessel-like sound wave; according to the related art.

This first approach to creating a Bessel-like beam, as described by Lu and Greenleaf, is further illustrated in FIGS. 1-2. FIG. 1 is a schematic view of the top of a flat piezoelectric disk with annular rings (electrodes A to H) on the visible side of the disk and a single common electrode on the opposite side of the disk; similar to that described by Lu and Greenleaf. FIG. 2 is a graph of the wave produced by excitation of the disk of FIG. 1, showing the wave amplitude (normalized to a maximum amplitude of 1.0, solid trace) vs. disk radius (e.g., the distance from the center of the disk) during excitation of (e.g., application of suitable voltages to) the electrodes to produce an Bessel-like sound wave. The waveform in FIG. 2 can be observed to approximate (e.g., have a shape substantially similar to) a Bessel function. The dashed line overlay indicates the radial widths of the annular rings and the association of each annular ring A-H with respective peaks or sections of the wave; the vertical segments are included for visual clarity/separation, and do not necessarily indicate any ring thicknesses, offsets, or amplitudes.

A second approach to creating a Bessel-like beam involves preparing a piezoelectric transducer using a so-called "non-uniform poling method". According to the non-uniform poling method, the piezoelectric elements are poled (e.g., the polarization alignment of the elements is changed) using a non-uniform electric field, such that the resulting piezoelectric polarization follows a Bessel-like function in the radial direction.

In both of these approaches, the design of the transducer requires special fabrication methods, and the required driving electronics are elaborate and complicated. Accordingly, sound imaging using such previously developed transducers has been limited.

One or more aspects of embodiments of the present disclosure provide a method of driving a transducer to produce a Bessel-like collimated sound beam at low frequencies (e.g., frequencies below 1 MHz), the method including: exciting a flat disk piezoelectric transducer at one or more radial mode excitation frequencies to generate a vibration; and producing a Bessel-like collimated sound beam from the vibration of the excited disk.

The terms "excitation frequencies", "vibration frequencies", "resonance frequencies", and like terms, as used interchangeably herein, refer to frequencies at which the piezoelectric transducer vibrates or resonates at relatively high amplitudes, as further discussed below. The term "radial mode excitation frequency (frequencies)" refers to the frequency (frequencies) at which the piezoelectric disk resonates or vibrates in the radial direction. In addition, the terms "flat disk piezoelectric transducer", "piezoelectric disk transducer", and like terms may be interchangeably used to refer to a transducer made of a piezoelectric material in the shape of a flat disk.

In some embodiments, the method may additionally include clamping a perimeter (e.g., outer boundary, boundary wall, or circumference) of the flat disk piezoelectric transducer prior to exciting the flat disk piezoelectric transducer. As used herein, the term "clamping a boundary" may refer to immobilizing or reducing the movement of the curved lateral outer surface of the disk, for example, by attaching the disk to a heavier object or material along or across that surface.

Figure 3:
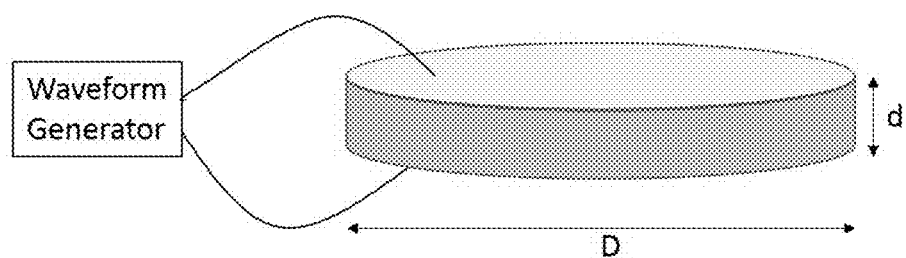
FIG. 3 is a schematic view of a related art piezoelectric transducer being driven at a sinusoidal voltage through a waveform generator.

A method of operating a piezoelectric transducer in the related art will now be described. FIG. 3 is a schematic view of a piezoelectric transducer disk having a diameter (D) larger than its thickness (d). The transducer is driven using a sinusoidal voltage that is applied through a waveform generator. The transducer thus alternately expands and contracts at a vibration frequency corresponding to the frequency of the excitation sine wave. When the transducer is immersed in a fluid medium, these vibrations may be converted into acoustic waves that radiate through the medium.

Resonance phenomena, in which the transducer vibrates at a greater amplitude at specific frequencies due to facile storage of vibrational energy (e.g., generation of a standing wave), may occur when the vibrational waves are matched to the geometric properties of the transducer. For example, when the transducer is a disk (e.g., has a disk shape) as shown in FIG. 3, a thickness mode resonance (e.g., standing wave vibration that propagates along the thickness direction) occurs when the wavelength of the sound wave in the piezoelectric disk is exactly half the disk thickness. Most flat disk piezoelectric transducers are operated at this thickness mode resonance excitation frequency. However, a flat disk piezoelectric transducer can be excited at many other vibration modes.

The vibration modes of a piezoelectric disk having a large (diameter/thickness) ratio may be classified into five groups: radial (R) mode, edge (E) mode, thickness shear (TS) mode, thickness extensional (TE) mode, and high-frequency radial (A) mode, as described by Guo (Guo, N., et al., "The finite element analysis of the vibration characteristics of piezoelectric discs," *J. Sound Vibration* 159 (1): 115-138, 1992, the entire content of which is incorporated herein by reference). The resonant frequencies of the radial (R) mode and high-frequency radial (A) mode are strongly dependent on the radius or diameter of the piezoelectric disk. The resonant frequencies of the edge (E) mode, thickness shear (TS) mode, and thickness extensional (TE) mode are strongly dependent on the thickness of the piezoelectric disk.

Further, the group modes typically occur at different frequency ranges. For example, radial (R) mode resonances appear at the lowest frequencies. The edge (E) mode, thickness shear (TS) mode, and thickness extensional (TE) mode resonances appear at the middle frequencies. The high-frequency radial (A) mode resonances appear at the highest frequencies.

Figure 4:
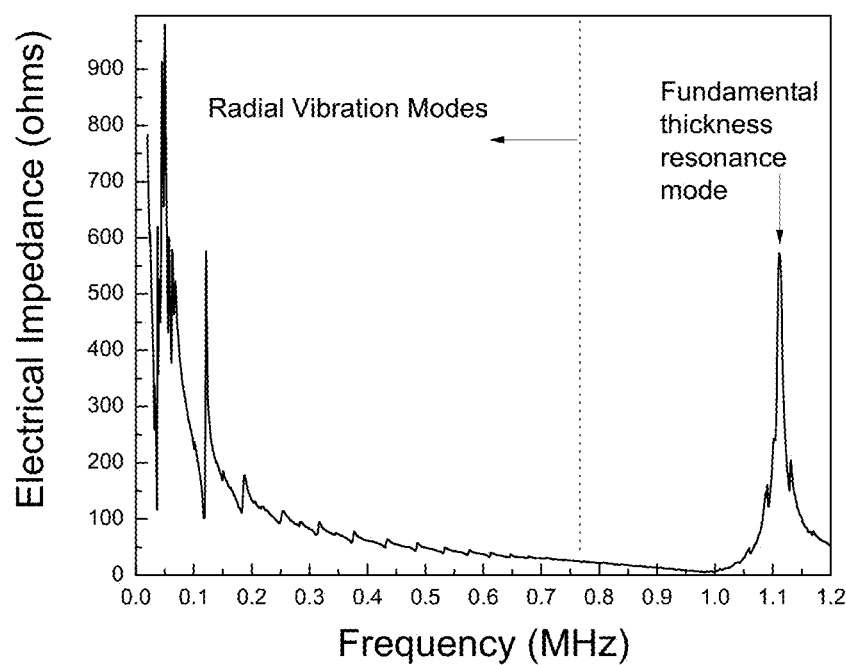
FIG. 4 is a graph of the electrical impedance spectrum of a piezoelectric disk that is 50 mm in diameter and 2.1 mm thick.

Resonances in the radial (R) mode may occur at a fundamental mode frequency, as well as at some overtone mode frequencies with inharmonic frequency separation. Impedance spectroscopy can be used to measure the values of such resonance frequencies. FIG. 4 is a graph of the electrical impedance spectrum between about 20 kHz to about 1.2 MHz of an example lead zirconium titanate (PZT) piezoelectric disk that is 50 mm in diameter and 2.1 mm thick. The impedance peak minima and maxima correspond to the resonant and anti-resonant frequencies, respectively, of the piezoelectric transducer. Frequencies corresponding to the combined radial (R) and edge (E) modes can be seen on the left side of the graph (labeled "radial vibration modes"). The fundamental thickness (TE) resonance mode for this disk can be seen on the right side of the graph near 1.1 MHz.

The terms "fundamental mode" and "fundamental frequency" are interchangeably used herein in their art-recognized sense to refer to the lowest frequency at which the transducer can vibrate according to a standing periodic waveform. The fundamental frequency typically corresponds to a standing wave having a wavelength twice the thickness of the transducer along that mode. The terms "overtone mode" and "overtone frequency" are interchangeably used herein in their art-recognized sense to refer to frequencies higher than the fundamental frequency, typically at integer multiples of the fundamental frequency except in the case of inharmonic frequency separation, in which the overtone frequencies are offset from those multiples. In some embodiments, the degree of such separation depends on the material characteristics of the transducer, with stiffer materials typically being associated with a greater degree of inharmonic frequency separation.

Figure 5:
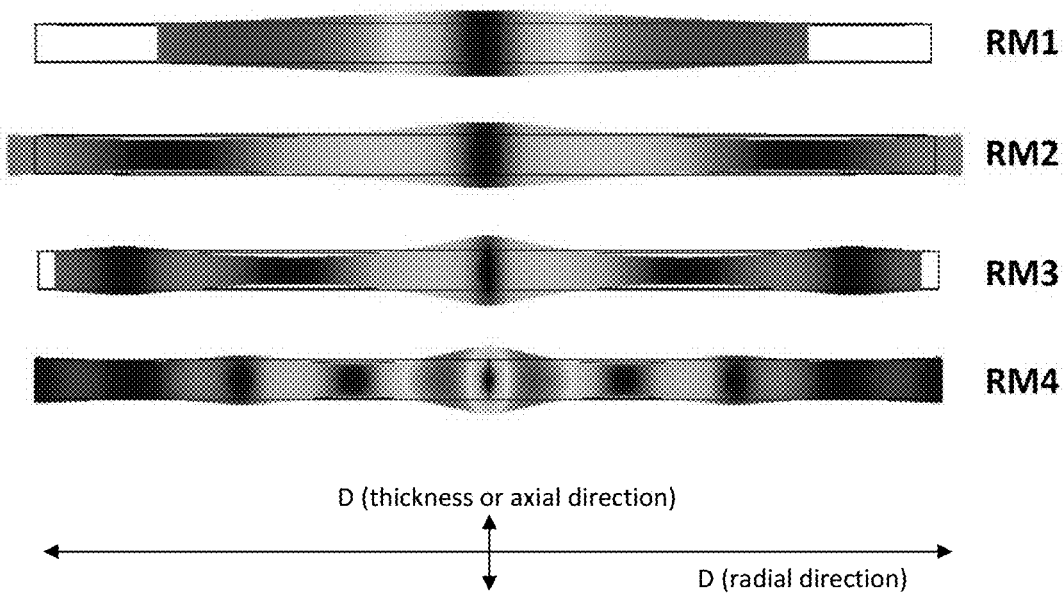
FIG. 5 is a schematic image depicting vibration and deformation in a piezoelectric disk driven at the fundamental radial mode excitation frequency RM1 and at radial mode overtone excitation frequencies RM2, RM3, and RM4.

FIG. 5 is a schematic image depicting vibration and deformation in the example piezoelectric disk of FIG. 4 being driven at the fundamental radial mode excitation frequency RM1 and at radial mode overtone excitation frequencies RM2, RM3, and RM4, respectively. These modes correspond to the four lowest frequency resonances starting at 50 KHz in FIG. 4. The black outlines indicate the volume of the piezoelectric disk at rest (e.g., when not being driven). The gradient shaded regions indicate the volume of the disk under deformation (e.g., when being driven at the indicated excitation mode). The red and blue regions correspond to wave minima and maxima, respectively, while intermediate colors correspond to intermediate amplitude values such as nodes. The waves are observed to stand in the radial direction (e.g., along the diameter D), while deformation occurs with the wave amplitude along the thickness direction (e.g., along the thickness d).

According to embodiments of the present disclosure, the method of producing a Bessel-like collimated sound beam by exciting the flat disk piezoelectric transducer in the radial mode may produce sound waves for imaging applications having frequencies below 1 MHz, for example, about 70 KHz to about 1 MHz. In some embodiments, the method may be used to produce sound waves at about 10 KHz to about 150 kHz, as used in applications for underground imaging of oil and gas boreholes, geothermal energy development, $CO_2$ sequestration, and nuclear waste disposal.

The method uses a single flat disk transducer in lieu of the more complicated multi-electrode or non-uniform poled Bessel transducers of the related art. The transducer does not need to be patterned with multiple annular electrodes, does not include any annular electrode(s), and has only a single electrode on each face of the disk. The transducer may be configured using one or more suitable methods to have radial mode excitation frequencies at or within a desired frequency range for imaging. Annular vibration patterns are then generated on the surface of the disk by exciting (e.g., applying a sinusoidal voltage to) the transducer at these radial mode excitation frequencies. Acoustic radiation from these vibration patterns is subsequently combined in front of the disk transducer inside a fluid medium to produce a Bessel-like beam.

The size of the transducer is not particularly limited, and can be adapted to any use or specific requirement as long as its geometry factors (e.g., diameter to thickness ratios) are selected to produce suitable or desired resonance frequencies, as discussed below. In some embodiments, the transducer may have a diameter of about 2 mm to about 10 cm, for example, about 5 mm to about 5 cm, or about 1 cm to about 3 cm. In some embodiments, the transducer may have a thickness of about 1 mm to about 5 cm, for example, about 2 mm to about 3 cm or about 3 mm to about 2 cm. However, it is understood that the diameter and thickness of the transducer may be selected according to the operational needs of the application, the desired resonance frequencies, etc.

High or low temperature operations can be accommodated by simply selecting a suitable piezoelectric material. For example, lithium niobate and similar materials may be used in applications and environments that can reach 500° C. or more. Non-limiting examples of materials used in high temperature operations (e.g., temperatures of greater than about 500° C., for example 500° C. to 2000° C.) may include $LiNbO_3$, langatates, langasites, aluminum nitride, quartz, etc., but embodiments of the present disclosure are not limited thereto. Many of these materials may also be suitably used for low temperature operations (e.g., temperature below about 500° C.).

The thickness of the electrode is not particularly limited as long as the resulting weight of the electrode does not undesirably affect the resonance frequencies produced by the disk. In some embodiments, the electrode may be a thin film coating. For example, the electrode may have a thickness of a few microns, or about 1 micron to about 100 micron.

The piezoelectric transducer may be configured to exhibit resonance at or within a specific or suitable range of radial mode excitation frequencies using one or more of the following strategies.

First, the range of radial mode excitation frequencies may be configured by changing the electrode coverage of the piezoelectric disk (e.g., the proportion of the surface area of the disk that is covered by the electrode, which remains radially symmetric). When the electrode coverage is reduced, the resonance spectrum of the radial modes may shift to higher frequency ranges. In contrast, when the electrode coverage is increased, the resonance spectrum for the radial modes may shift to lower frequency ranges. In some embodiments, the electrode coverage of the piezoelectric disk may range from about 30% to about 90%, for example, about 50% to about 75%. However, embodiments of the present disclosure are not limited thereto.

Second, the range of radial mode excitation frequencies depends on the electromechanical coupling of the transducer, which is inherent to the piezoelectric material. Accordingly, the range may be configured by selecting an appropriate transducer material. Non-limiting examples of such transducer materials may include lead zirconate titanate (PZT), $LiNbO_3$, lanthanum gallium tantalite (langatate, LGT), lanthanum gallium silicate (langasite, LGS), quartz, bismuth titanate, gallium orthophosphate, aluminum nitride, any 1-3 piezo-composite, etc.

Figure 6:
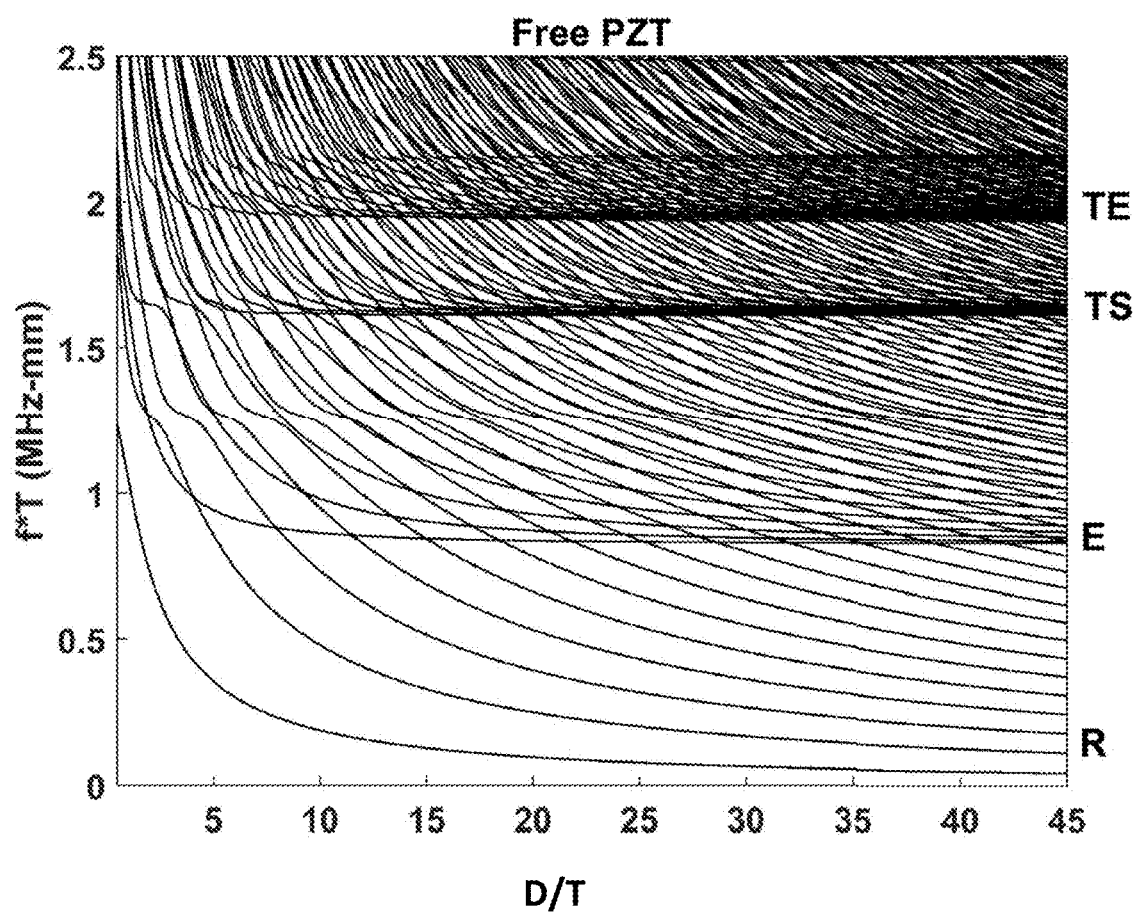
FIG. 6 is a graph showing the variation of the frequency for different excitation modes of a piezoelectric disk as a function of the diameter-thickness ratio.

Third, the excitation frequencies of a radial transducer may be configured in terms of its diameter/thickness (D/T) ratio. FIG. 6 is a graph showing the relationship between mode excitation frequency and disk geometry for various resonance modes of a piezoelectric disk. Each plot illustrates the frequency of a resonance mode as a function of disk D/T ratio, which may be used to guide selection of an appropriate D/T ratio according to its effect on the transducer vibration frequencies. The lower end of the R (radial), E (edge), TS (thickness shearing), and TE (thickness extension) resonance mode ranges are marked on the right side of the graph. The lowest frequency plot within each range corresponds to the fundamental mode for that range, with higher frequency plots corresponding to overtone modes. In FIG. 6, a dotted line corresponding to a particular diameter-thickness ratio (shown on the graph's x-axis) is vertically drawn to intersect each frequency plot. The y value of each intersection point gives the resulting frequency-thickness product (shown on the graph's y-axis, left) of each excitation mode for a disk transducer having that particular geometry ratio. The frequencies (y-axis values) of the first four radial modes at a D/T ratio of about 24 are highlighted by the hollow circles at the intersection points in the graph.

As can be observed from FIG. 6, higher D/T ratios are associated with a decrease in the frequencies (e.g., frequency-thickness products) of the excitation modes, and the rate of decrease is highest for D/T ratios closer to 1. In some embodiments, the D/T ratio of the transducer may range from about 5 to about 50; for example, about 10 to about 25.

The D/T ratio of the transducer can be matched to the specific imaging application. For example, imaging applications in highly attenuating media require lower frequencies, since the amount of attenuation (α) is proportional to the imaging frequency (f) raised to the power n (e.g., $\alpha \propto f^n$), where n=1-2. A non-limiting example of such an application is imaging through rock (e.g., as needed in oil, gas, and geothermal development), which requires frequencies of about 10 kHz to about 150 kHz; hence, disks having higher D/T ratios are suitably used. For biomedical applications, imaging can be accomplished using higher frequencies of about 300 KHz to about 600 kHz, and therefore disks having smaller D/T ratios can be used.

Fourth, in some embodiments, the frequency bandwidth of the transducer may be increased by backing the transducer with a heavy (e.g., dense) material. The heavy material may be substantially similar to the backing material used in related art transducers. For example, the backing material may be selected from tungsten loaded epoxy, brass, alumina/epoxy, metal composites, and mixtures or combinations thereof.

Fifth, in some embodiments, the piezoelectric transducer may be laterally stiffened (e.g., configured to have increased stiffness in the radial direction). In some embodiments, the lateral stiffening may be achieved by mechanically attaching a clamp to the boundary of the flat disk piezoelectric transducer. As used herein, the term "boundary" may be interchangeable with the terms "circumference", "perimeter", and like terms, and may refer to the curved surface comprising the outside of a piezoelectric transducer in the shape of a disk or cylinder, e.g., perpendicular to the radius of the piezoelectric disk. The method of clamping is not particularly limited or restricted to any method or arrangement. As used herein, the term "clamp" may refer to any object or material used to hold, secure, or constrain another object or material from certain types of movement. The term "clamping" may refer to the act of applying or attaching a clamp to an object or material.

Figure 7:
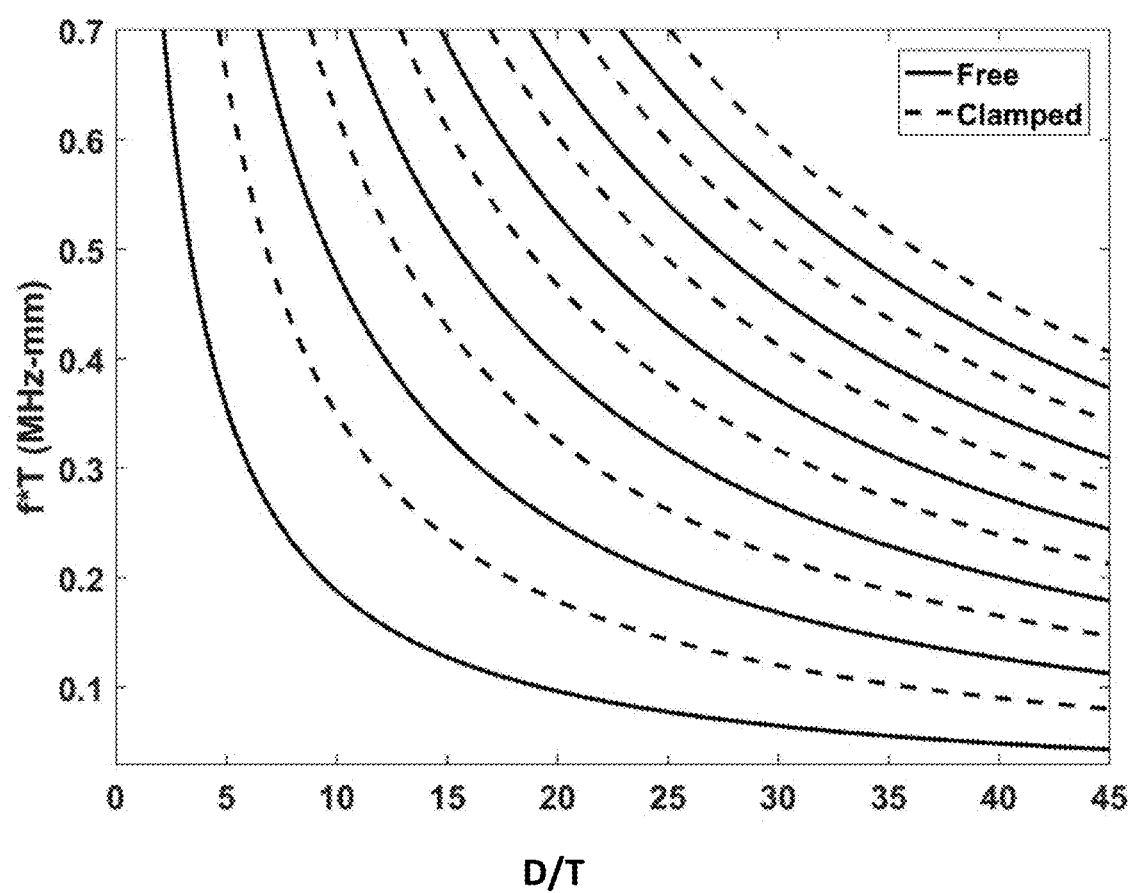
FIG. 7 is a graph showing the relationship between mode excitation frequency and disk geometry for the first six radial resonance modes of a piezoelectric disk transducer when free (e.g., unclamped, solid lines) and clamped (dashed lines)

FIG. 7 is a graph showing the relationship between mode excitation frequency and disk geometry for the first six radial resonance modes of a piezoelectric disk. In addition, FIG. 7 compares the calculated frequencies of the free transducer (e.g., unclamped, solid lines) and equivalent clamped transducer (dashed lines). The clamped transducer is simulated as a laterally attached spring having radial and axial k= . . . . Each plot illustrates the frequency-thickness product corresponding to a resonance mode as a function of disk diameter/thickness (D/T) ratio. FIG. 7 demonstrates that the excitation frequencies of each resonance mode are increased in the clamped piezoelectric transducer relative to the free transducer. Further, the degree of increase is greater for disks having smaller D/T ratios.

Although the simulated transducer of FIG. 7 is substantially completely clamped (e.g., so that the lateral stiffness is modeled by a spring having k=∞), the degree of stiffness is not limited thereto. In some embodiments, for example, the piezoelectric transducer may be clamped with a material having a measurable flexibility.

In some embodiments, the clamping of the piezoelectric transducer around its periphery may be attained by embedding the flat disk piezoelectric transducer in a larger mass of dissimilar material ("clamping material" or "enclosure") so that the radial perimeter (e.g., circumference) of the flat disk piezoelectric transducer is held in place or constrained by the dissimilar material, thereby forming a clamped transducer. As used herein, the terms "embed", "enclose", and related terms refer to insertion or partial insertion of the flat disk piezoelectric transducer into the clamping material so that at least a portion of the outer surface of the flat disk piezoelectric transducer (e.g., the surface at and/or near the perimeter of the disk) is surrounded by the clamping material. In some embodiments, a first portion of the outer surface of the flat disk piezoelectric transducer is surrounded by the clamping material, while another portion of the outer surface of the flat disk piezoelectric transducer (e.g., a portion of at least one circular faces of the disk) is free from and not in contact with the clamping material. The amount of vibration and/or movement in the surrounded portions of the flat disk piezoelectric transducer is constrained or reduced by the clamping material, but is not constrained in the free portions. In some embodiments, the entire outer surface of the flat disk piezoelectric transducer is surrounded by the clamping material so that a first portion is constrained or by the clamping material, while another portion of at least one circular faces of the disk is protected by a thin cover of the material, but is still able to vibrate and move. The thin cover may act as a wear plate that protects the piezoelectric transducer from corrosive and other adverse media. The thin cover may have any suitable thickness and be formed of any suitable material as long as it is capable of allowing vibration and movement. The clamping of the piezoelectric transducer may generate new radial modes and additional fine vibration structure to the electrical impedance spectrum, thereby increasing the number of radial mode resonance frequencies and broadening the range of available imaging frequencies. In some embodiments, the clamping may also increase or enhance beam collimation, and/or reduce or substantially eliminate the side lobes that are usually generated by transducers in the related art.

Figure 8A:
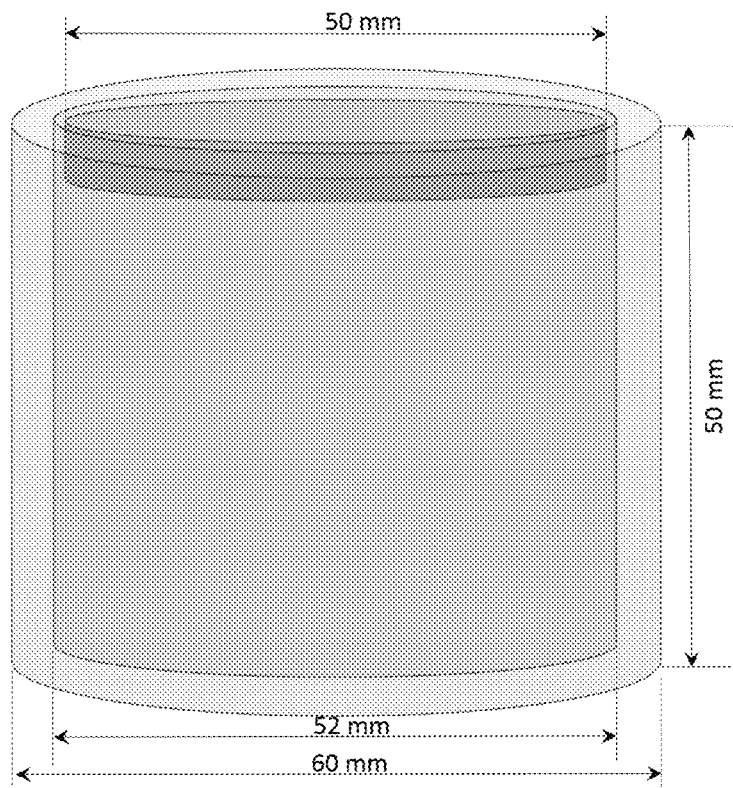
FIG. 8a is a schematic image of a transducer including a piezoelectric disk (grey) in which the perimeter of the disk is mechanically clamped by being embedded in a cylinder of dissimilar material (blue), according to embodiments of the present disclosure.
Figure 8B:
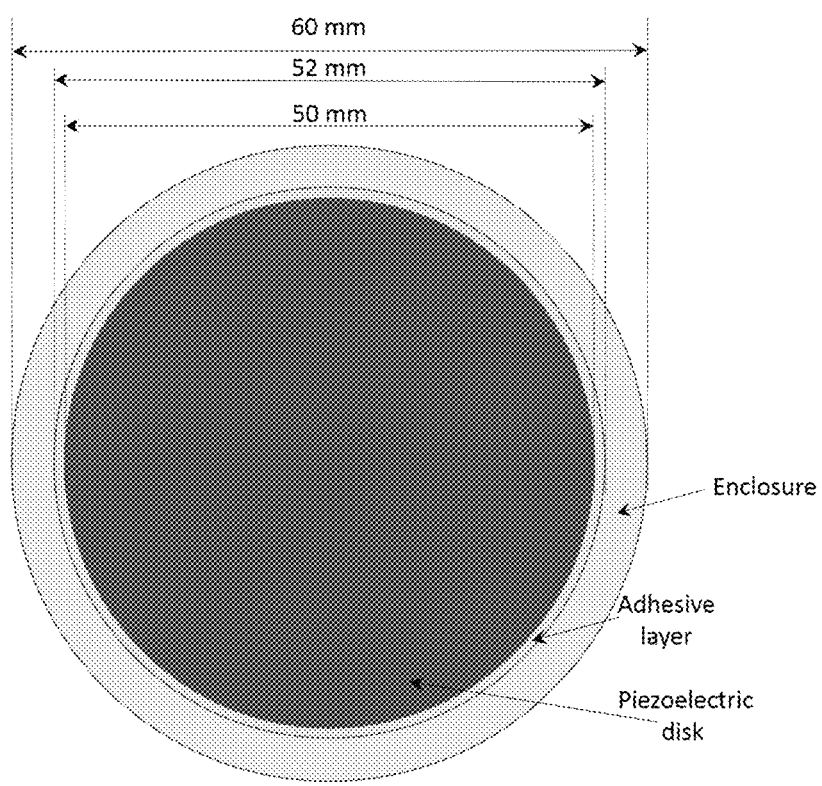
FIG. 8b is a schematic image of the transducer of FIG. 8a from a top-down perspective, showing the round piezoelectric disk surrounded by an adhesive layer and an enclosure layer (e.g., the cylinder of dissimilar material), according to embodiments of the present disclosure.

In some embodiments, when the clamping of the piezoelectric transducer is attained by embedding the flat disk piezoelectric transducer in a larger mass of dissimilar material, the larger mass may have the shape of a cylinder or ring. FIG. 8a-8b are schematic images showing the structure of a transducer including a piezoelectric disk (grey) embedded in a cylinder of dissimilar material ("enclosure", blue) from the side and top-down views, respectively. An adhesive layer between the circumference of the piezoelectric transducer and the enclosure is included to durably and securely attach the piezoelectric disk to the interior of the enclosure. It is to be understood, however, that the dimensions and embodiments depicted in FIG. 8a-8b are not to be construed as limiting the sizes of possible embodiments. For example, the dimensions (sizes) of the piezoelectric transducer and the enclosure (including the lengths, outer diameters, and inner diameters, if applicable, of the piezoelectric transducer and enclosure) may be any suitable combination of dimensions, as long as the piezoelectric transducer disk fits within the enclosure, the clamped transducer has a height, depth, and/or width suitable for the imaging application, and the clamped transducer vibrates at the desired resonance frequencies, as discussed above.

In some embodiments, when the piezoelectric transducer is clamped via embedding in an enclosure, the enclosure may have any suitable height. In some embodiments, the height of the enclosure may be about 1 to about 50 times the height (thickness) of the piezoelectric transducer. In some embodiments, the height of the enclosure is similar to or substantially identical to the height (thickness) of the piezoelectric transducer, such that the enclosure may also be considered to have the shape of a ring or disk.

When the enclosure is a cylinder, ring, or disk, the wall thickness (e.g., the difference between the outer diameter and the inner diameter of the enclosure) may be any suitable thickness. In some embodiments, the wall thickness may be about 1 mm to about 100 mm; for example, about 1 mm to about 10 mm. However, embodiments of the present disclosure are not limited thereto.

The enclosure may be formed of any suitable material that is dissimilar to the material used to form the piezoelectric transducer. For example, the enclosure may be formed of a material having different piezoelectric characteristics than the material used to form the piezoelectric transducer; for example, a material exhibiting no piezoelectric effect.

The properties of the material used for the enclosure, such as density and stiffness, may affect the generation of new low frequency radial mode resonances, as discussed below. The effects of such properties and methods of quantifying such properties and their effects are within the understanding of those of ordinary skill in the art, and a person of skill in the art is capable of selecting suitable or appropriate materials for the enclosure based on the desired resultant radial mode resonances.

In some embodiments, when the piezoelectric transducer is clamped via embedding in an enclosure, the enclosure may be formed of a polymer plastic (such as poly(methyl methacrylate), polyethylene, polypropylene, polycarbonate, etc.), a metal or alloy (such as aluminum, steel, nickel, copper, etc.), a ceramic, a glass, or mixtures thereof. As used herein, the term "ceramic" may refer to an inorganic and non-metallic solid comprising atoms held together in networks of ionic and covalent bonds; for example, silicon carbide, silicon nitride, zirconium oxide, and the like. As used herein, the term "glass" may refer to a non-crystalline amorphous solid that exhibits a glass transition when heated; for example, silica glasses such as fused quartz, sodium borosilicate, and/or aluminosilicate.

In some embodiments, when the piezoelectric transducer is attached to the enclosure via an adhesive layer, the adhesive layer may include any suitable material or bonding agent capable of securely attaching the piezoelectric transducer to the inside of the enclosure. For example, the adhesive layer or bonding agent may include an epoxy, a hot melt thermoplastic, a polyurethane, polyimide, or polyacrylic resin, a cyanoacrylate resin such as superglue, a ceramic adhesive, or the like.

However, in some embodiments, the adhesive layer may not be included, and the piezoelectric transducer may be attached to the inside of the enclosure using alternate methods. For example, the piezoelectric transducer may be press-fit into the enclosure (e.g., be held in place by friction). In some embodiments, the enclosure may be directly formed (e.g., by extruding, sintering, drying, hardening, polymerizing, etc. the material of the enclosure) around the piezoelectric disk in order to embed the disk. In some embodiments, the enclosure may be secured around the piezoelectric transducer with the aid of mechanical clamps, screws, rivets, etc. However, it is to be understood that methods of attaching the piezoelectric transducer to the enclosure are not limited thereto, and that a person of skill in the art is capable of selecting suitable or appropriate methods based on the desired effect on the piezoelectric transducer.

In some embodiments, the clamping of the piezoelectric transducer around its periphery may be attained by using a spring (e.g., by attaching a spring to the periphery of the piezoelectric transducer). The term "spring" is used herein to refer to a material or device having an elasticity that makes it capable of storing and releasing energy in an oscillating motion that may be described according to Hooke's Law (e.g., harmonic oscillation). The form, dimensions, and material used for the spring are not particularly limited, and the spring may be selected or designed to have any suitable spring constant k. In some embodiments, the resonance frequencies of the radial modes may increase as k is increased (e.g., as the spring stiffness is increased). In some embodiments, the increase in resonance frequency may asymptotically approach a maximum value corresponding to that achieved when k= . . . . In some embodiments, the number of side lobes in the beam profile produced by the piezoelectric transducer may be decreased as k is increased. In some embodiments, the propagation distance of the beam may be increased as k is increased.

The piezoelectric transducer may be operated by applying a single frequency source to the transducer. For example, an electronic oscillator, voltage generator, etc. producing any periodic waveform may be used to drive the transducer at its radial mode excitation frequencies. However, the operation of the transducer is not limited to those frequencies, and the same transducer can be additionally used in the thickness resonance mode simply by driving the transducer at the appropriate thickness resonance mode frequencies.

As described above, the frequencies of the radial modes can be adjusted in several ways, thus providing a substantial frequency range of operation. Although the frequency of the generated beam cannot be continuously varied, very close radial resonance modes can be created so that frequencies can be hopped. For example, the radial resonance modes may be spaced apart by about 10 KHz to 300 kHz, for example, about 30 kHz to about 100 KHz.

In addition, collimated beams at multiple frequencies can be produced by alternatingly exciting multiple resonance modes, for example, in applications where different frequencies are required. This may be accomplished using any suitable function generator, such as those currently commercially available.

According to embodiments of the present disclosure, a device for sound imaging includes a piezoelectric transducer including: circular disk including a piezoelectric material; a first electrode on one side of the circular disk; and a second electrode on the opposite side of the circular disk; the disk piezoelectric transducer having one or more radial mode excitation frequencies; and a waveform generator configured to excite the flat disk piezoelectric transducer at the one or more radial mode excitation frequencies. The circular disk, electrodes, and piezoelectric transducer may be the same as described herein. Any suitable waveform generator may be used.

In some embodiments, the device for sound imaging further includes a clamp attached to a boundary of the piezoelectric transducer, for example, an enclosure comprising a material different from the piezoelectric material, where the piezoelectric transducer is embedded in the enclosure. The clamp and the enclosure may be the same as discussed above, however, embodiments of the present disclosure are not limited thereto.

In some embodiments, the device for sound imaging further includes an adhesive layer between the piezoelectric transducer and the enclosure. The adhesive layer may be the same as discussed above, however, embodiments of the present disclosure are not limited thereto.

Figure 9:
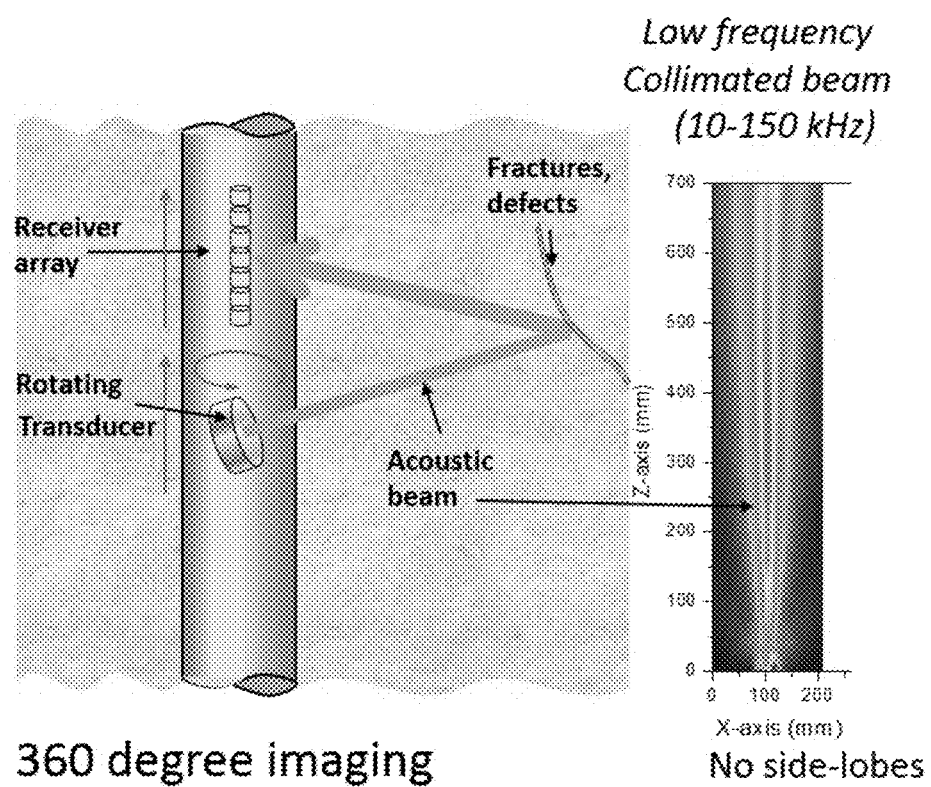
FIG. 9 is an image depicting an embodiment of a Bessel-like collimated sound beam generator being used in a bore hole imaging application.

The device for sound imaging may be used in combination with a receiver array for receiving the sound imaging data. The device for sound imaging may be used in any suitable environment or application, according to the characteristics of the piezoelectric transducer and device, as discussed above. FIG. 9 is an image depicting an embodiment of a Bessel-like collimated sound beam generator being used in a bore hole imaging application, where a low-frequency (10-150 kHz) sound beam generated using the method and/or device according to embodiments of the present disclosure is used to identify fractures or defects in the surrounding rock. The beam profile of the sound beam generated by the transducer (as shown on the right) is highly collimated and does not include side lobes. However, it is to be understood that the example embodiments depicted in FIG. 9 do not limit the scope of possible applications, devices, sound beams, etc.

The following examples and experimental data are provided for illustrative purposes only, and do not limit the scope of the embodiments of the present invention.

Example 1

A piezoelectric transducer was formed of a lead zirconium titanate disk having a diameter of about 28 mm and a thickness of about 2.1 mm.

Figure 10:
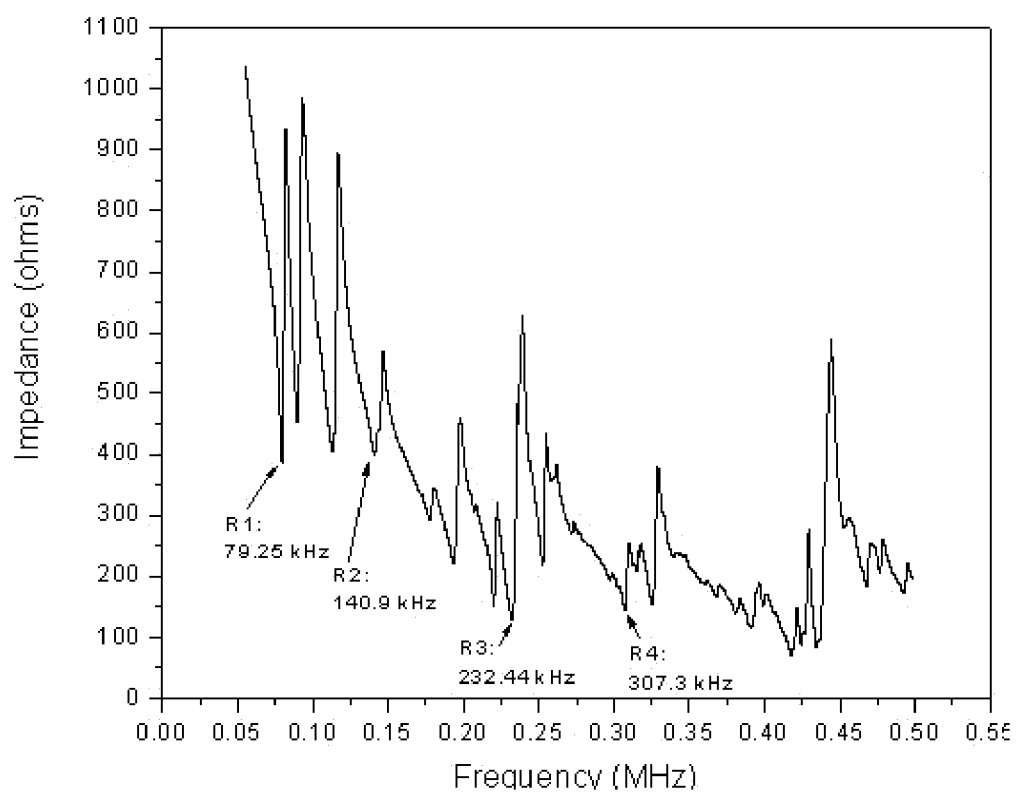
FIG. 10 is a graph of the electrical impedance spectrum of the piezoelectric disk transducer of Example 1 (with 28 mm diameter and 2.1 mm thickness) over a frequency range belonging to the radial mode group. The impedance minima corresponding to the fundamental radial mode excitation frequency RM-1 and the radial mode overtone excitation frequencies RM-2, RM-3, and RM-4 for this disk are indicated in the spectrum with arrows at 79.25 kHz, 170.9 kHz, 232.44 kHz, and 307.3 kHz.

The electrical impedance spectrum of the transducer was measured to determine its resonance mode frequencies. FIG. 10 is a graph of the electrical impedance spectrum over a frequency range belonging to the radial mode group. The impedance minima corresponding to the fundamental radial mode excitation frequency RM-1 and the radial mode overtone excitation frequencies RM-2, RM-3, and RM-4 for this disk are indicated in the spectrum with arrows at 79.25 kHz, 170.9 kHz, 232.44 kHz, and 307.3 kHz, respectively, falling within a frequency range of about 80 KHz to about 310 kHz. The resonance frequencies of this disk are observed to occur at higher frequencies than the disk of FIG. 4, as predicted by its lower D/T ratio (see FIG. 6).

Figure 11A:
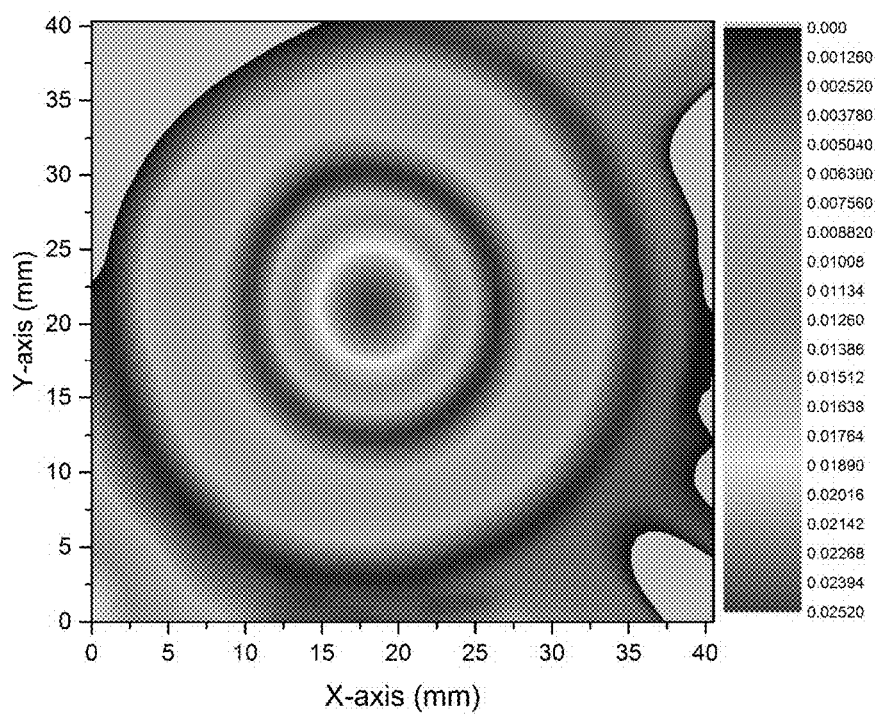
FIG. 11a is an image showing the vibration amplitude (perpendicular to the x-y plane) of a sound beam generated by the piezoelectric disk transducer of Example 1 resonating at a radial mode excitation frequency of 79.25 kHz in air, as measured with a laser Doppler vibrometer. The color gradient scale ranges through the visible spectrum from blue to red to denote increasing amplitudes above 0.

FIG. 11a is an image showing the vibration amplitude (perpendicular to the x-y plane) of an sound beam being generated by the piezoelectric transducer according to Example 1, as driven in a radial mode frequency of about 79.25 kHz in air. The resonance is measured with a laser Doppler vibrometer. The color gradient scale ranges through the visible spectrum from blue to red to denote increasing amplitudes above 0.

Figure 11B:
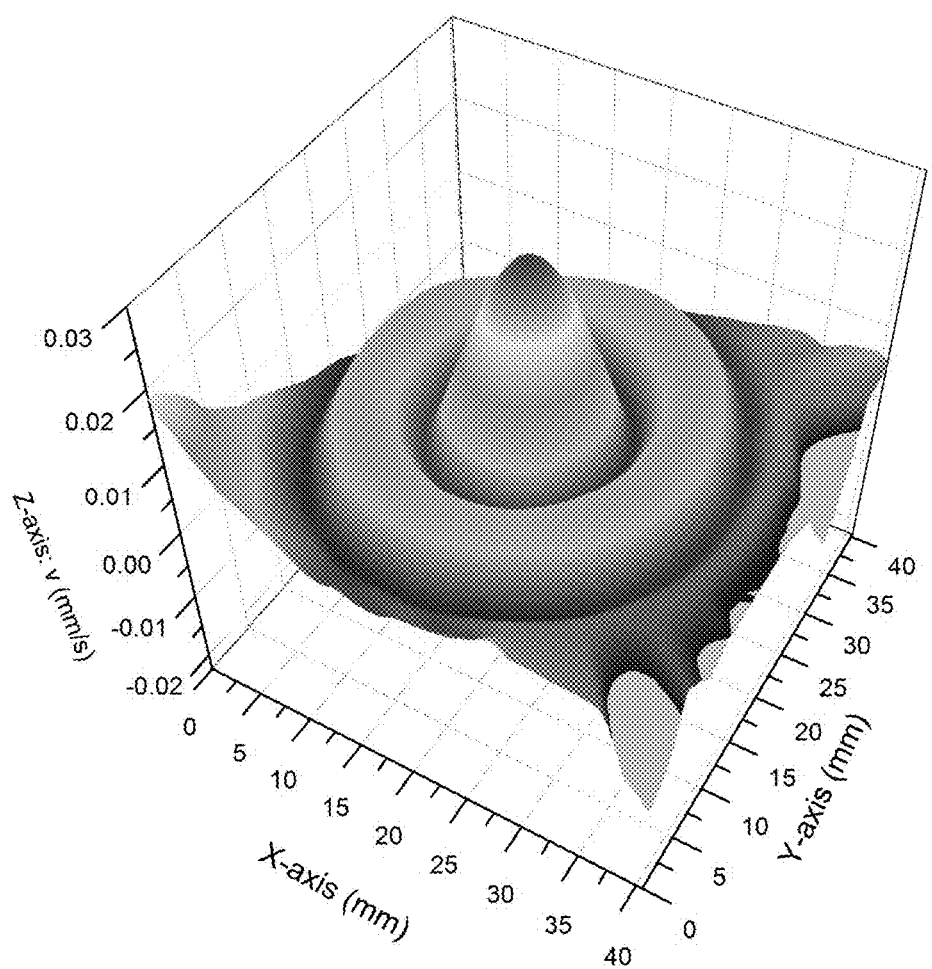
FIG. 11b is an image depicting FIG. 10a in 3D, using the same color scale, to show how the variation of vibration amplitude with respect to the radius of the disk is very similar to a Bessel function.

FIG. 11b is an image depicting FIG. 11a in 3D, using the same color scale, showing that the variation of vibration amplitude with radius in the sound beam is very similar to a Bessel-like function. FIGS. 11*a*-11*b* demonstrate that the piezoelectric disk according to example embodiments of the present disclosure and the method of driving a transducer according to example embodiments of the present disclosure may be used to generate an sound wave with a Bessel-like amplitude profile. The vibration amplitude distribution is very similar to that generated by a traditional Bessel beam transducer including annular rings that are individually excited (e.g., as shown in FIGS. 1-2).

Example 2

A piezoelectric transducer was formed of a lead zirconium titanate (PZT-4) disk having a diameter of about 50 mm and a thickness of about 2.1 mm.

Figure 12:
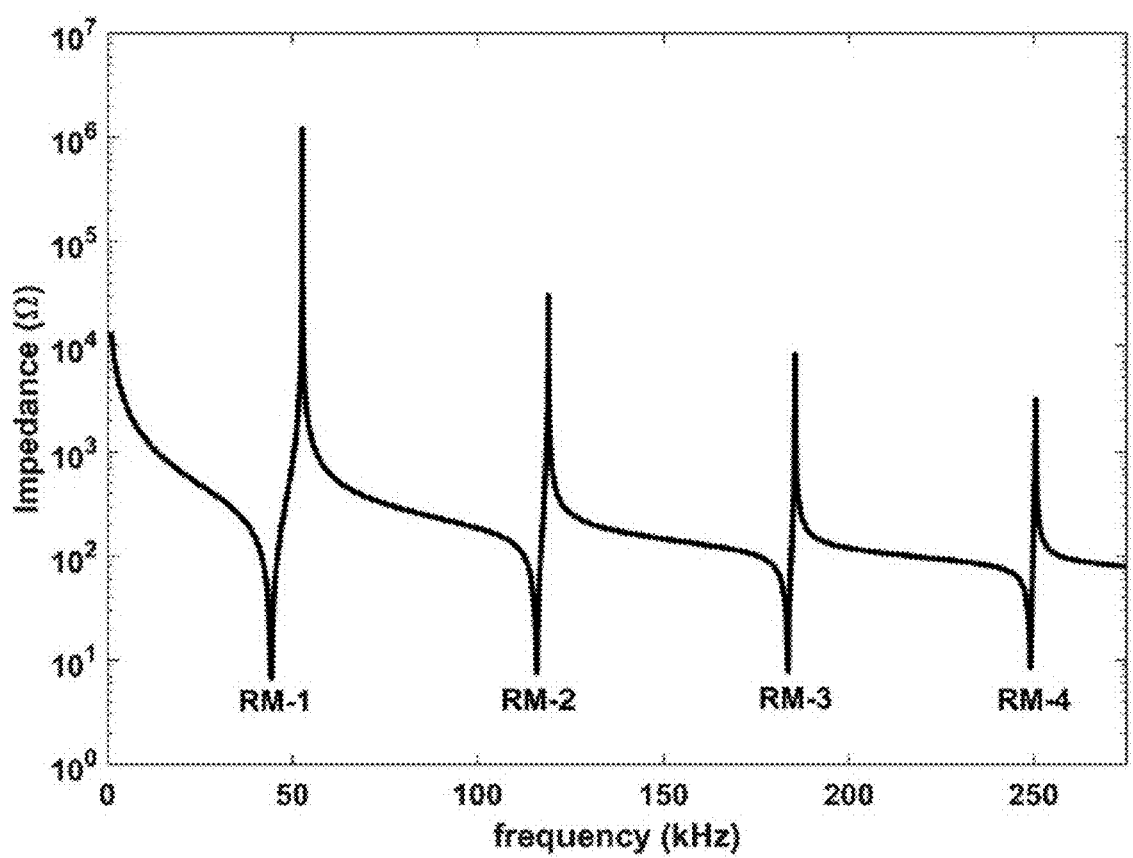
FIG. 12 is a graph of the electrical impedance spectrum of the piezoelectric disk transducer of Example 2 over a frequency range belonging to the radial mode group (about 0 kHz to about 275 kHz)

The electrical impedance spectrum of the transducer of Example 2 was measured to determine its resonance mode frequencies. FIG. 12 is a graph of the electrical impedance spectrum over a frequency range belonging to the radial mode group (about 0 KHz to about 275 kHz). The impedance minima corresponding to the fundamental radial mode excitation frequency RM-1 and the radial mode overtone excitation frequencies RM-2, RM-3, and RM-4 occur at about 44.2 kHz, 116.1 kHz, 183.6 kHz, and 249.1 kHz, respectively, falling within a frequency range of about 40 kHz to about 250 KHz. The dimensions of this disk transducer, and therefore the resonance frequencies of this disk are substantially similar to the disk of FIG. 4.

Figure 13:
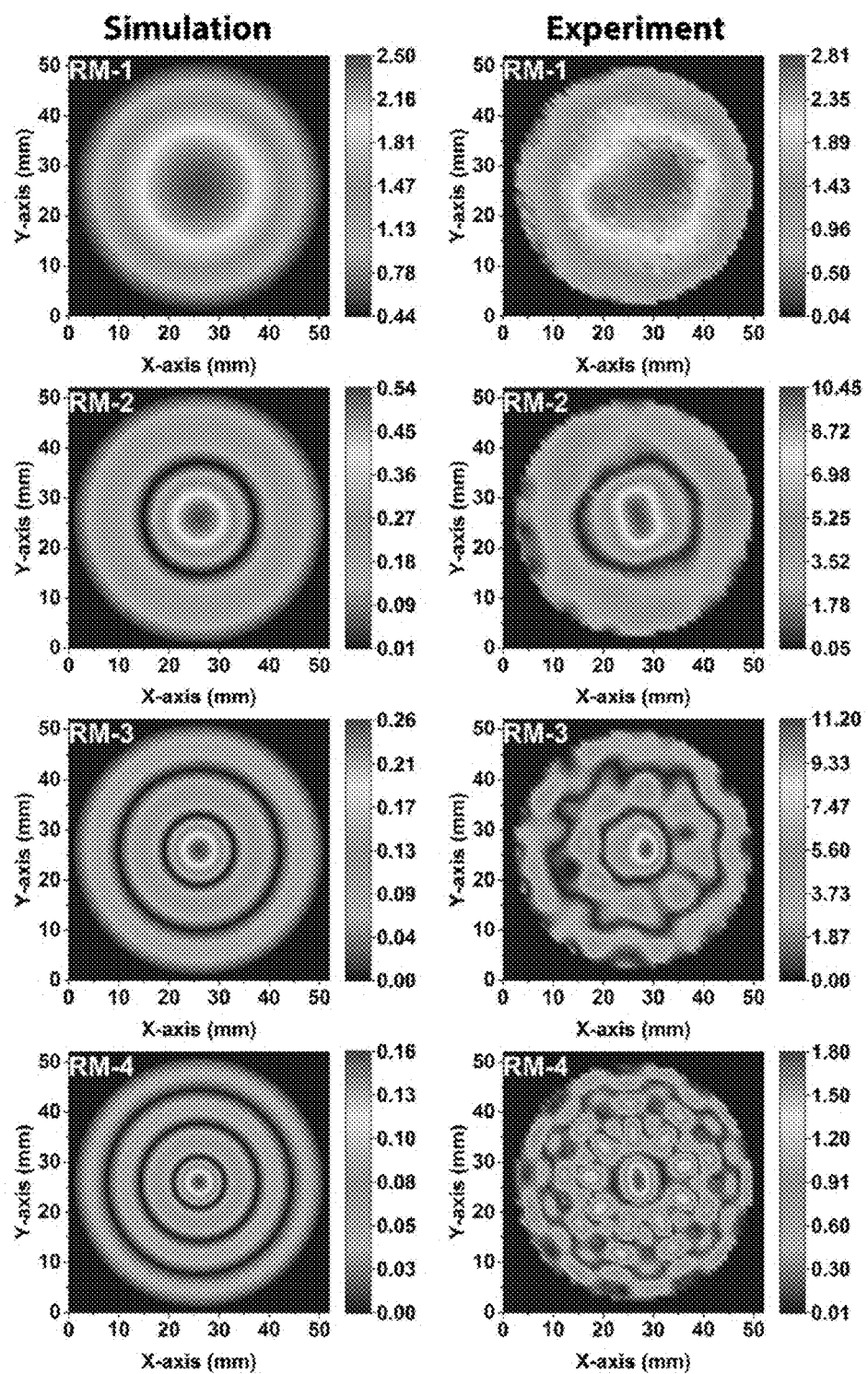
FIG. 13 is an image comparing simulated and experimental sound beam vibration patterns produced by the piezoelectric disk transducer of Example 2 when driven at the first four radial mode frequencies (RM-1 to RM-4). The color gradient scale ranges through the visible spectrum from blue to red to denote increasing amplitudes above 0.

FIG. 13 is an image comparing simulated and experimental sound beam vibration patterns produced by the piezoelectric disk transducer of Example 2 when driven at the first four radial mode frequencies (RM-1 to RM-4) using a laser vibrometer (OFV-5000, Polytec, Irvine, CA) and sensor head (OFV-505, Polytec, Irvine, CA). Again, the color gradient scale ranges through the visible spectrum from blue to red to denote increasing amplitudes above 0. In FIG. 13, each plot resembles a zeroeth-order Bessel function ($J_0$), but the number of radial nodes in the vibration pattern increases as the frequency (mode index) increases from RM-1 to RM-4. The simulated results are axisymmetric and represent an ideal transducer capable of producing pure (unmixed) modes. The experimental results exhibit azimuthal periodicity due to inhomogeneities in the transducer material, which introduce asymmetry into the disk and produce non-axisymmetric modes that are superimposed on the axisymmetric modes to form the observed radial lobes. The number of radial lobes increases as the resonance frequency increases.

Figure 14:
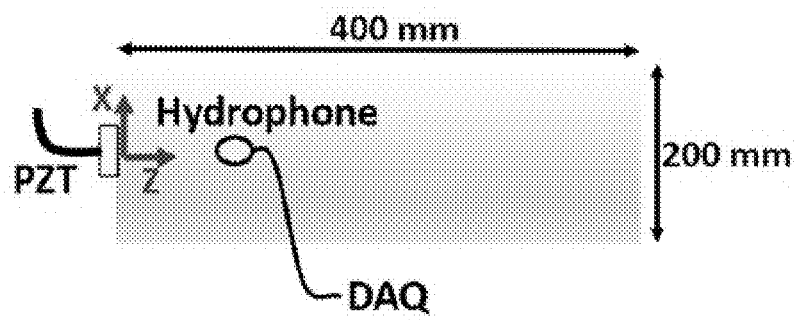
FIG. 14 is a schematic image of the experimental setup for beam profile measurements in water.

Various beam profiles of collimated sound beams generated at a low frequencies (<1 MHz) by the piezoelectric disk transducer of Example 2 were measured in a water immersion tank. FIG. 14 is a schematic image of the experimental setup for beam profile measurements in water. The piezoelectric disk transducer (PZT) is placed in a tank and a beam profile measuring about 200 mm by about 400 mm (or smaller) in the x-z plane is collected to avoid interference from the reflection of the beam against the tank walls. The pressure field generated in the water tank by the transducer is monitored using a hydrophone (Reson TC4013, Teledyne, Thousand Oaks, CA) attached to a data acquisition (DAQ) device.

Figure 15:
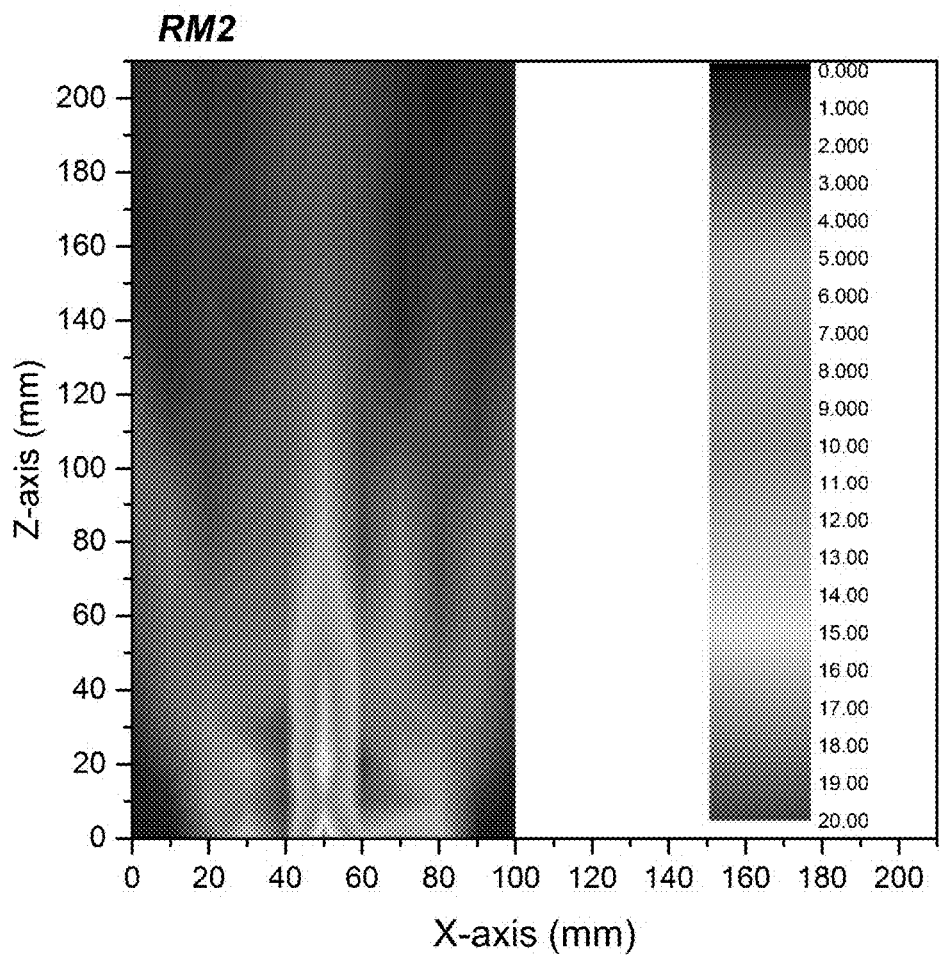
FIG. 15 is an image depicting a beam profile measurement of the piezoelectric disk transducer of Example 2 driven at a frequency of 118.66 kHz (RM2), made in a water bath with a piezoelectric receiver scanned in the x-y direction at various distances normal (e.g., perpendicular) to the surface of the transducer. The intensity of each beam profile is shown according to the color map on the right side of each image, ranging from blue (lowest intensity) to red (highest intensity)
Figure 16A:
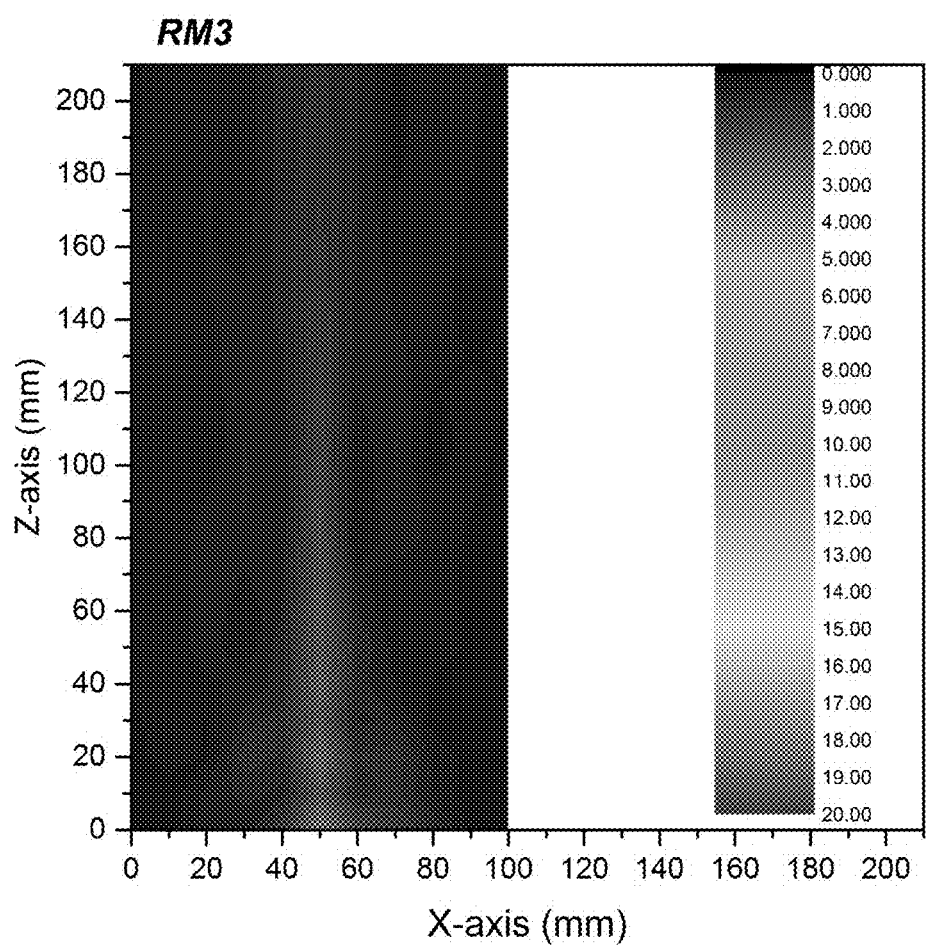
FIG. 16a is an image depicting a beam profile measurement of the piezoelectric disk transducer of Example 2 driven at a slightly higher frequency radial mode excitation frequency of 182.62 kHz (RM-3)
Figure 16B:
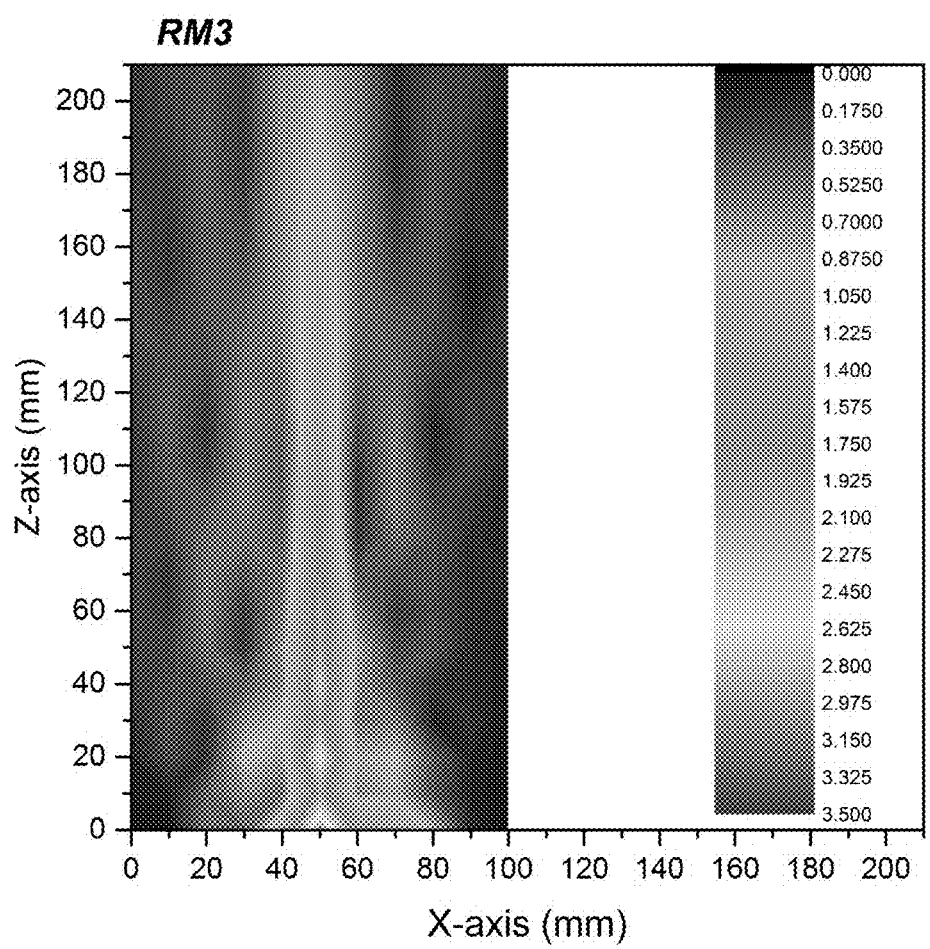
FIG. 16b is an image depicting the beam profile measurement of FIG. 16a at a smaller amplitude scale to aid in visualization of the beam profile.

FIGS. 15 and 16*a*-16*b* are images depicting beam profile measurements made in a water bath of the piezoelectric transducer of Example 2. The intensity of each beam profile is shown according to the color map on the right side of each image, ranging from blue (lowest intensity) to red (highest intensity). FIG. 15 is an image depicting a beam profile measurement of the piezoelectric transducer of Example 2 being driven at a frequency of about 118.66 kHz (RM-2 or second radial mode). A narrow beam extending in the z-direction (corresponding to the green region) can be clearly seen at x=50 mm. A transducer of the same diameter being driven according to the related art (e.g., in the thickness resonance mode) would need to have a thickness almost 10 times larger in order to give comparable results, and would have a beam divergence of about 30 degrees, clearly demonstrating the advantage of this new simple approach.

FIG. 16*a* is an image depicting a beam profile measurement of the piezoelectric transducer of Example 2 being driven at a slightly higher frequency radial mode excitation frequency of about 182.62 kHz (RM-3 or third radial mode). The amplitude of the excitation at this higher frequency is lower than the amplitude of excitation at the RM-2 frequency. FIG. 16*b* is an image depicting the beam profile measurement of FIG. 16*a* at a smaller amplitude scale to aid in visualization of the beam profile. The narrowness and the high degree of collimation at this frequency may also be clearly seen in the beam profile.

Figure 17:
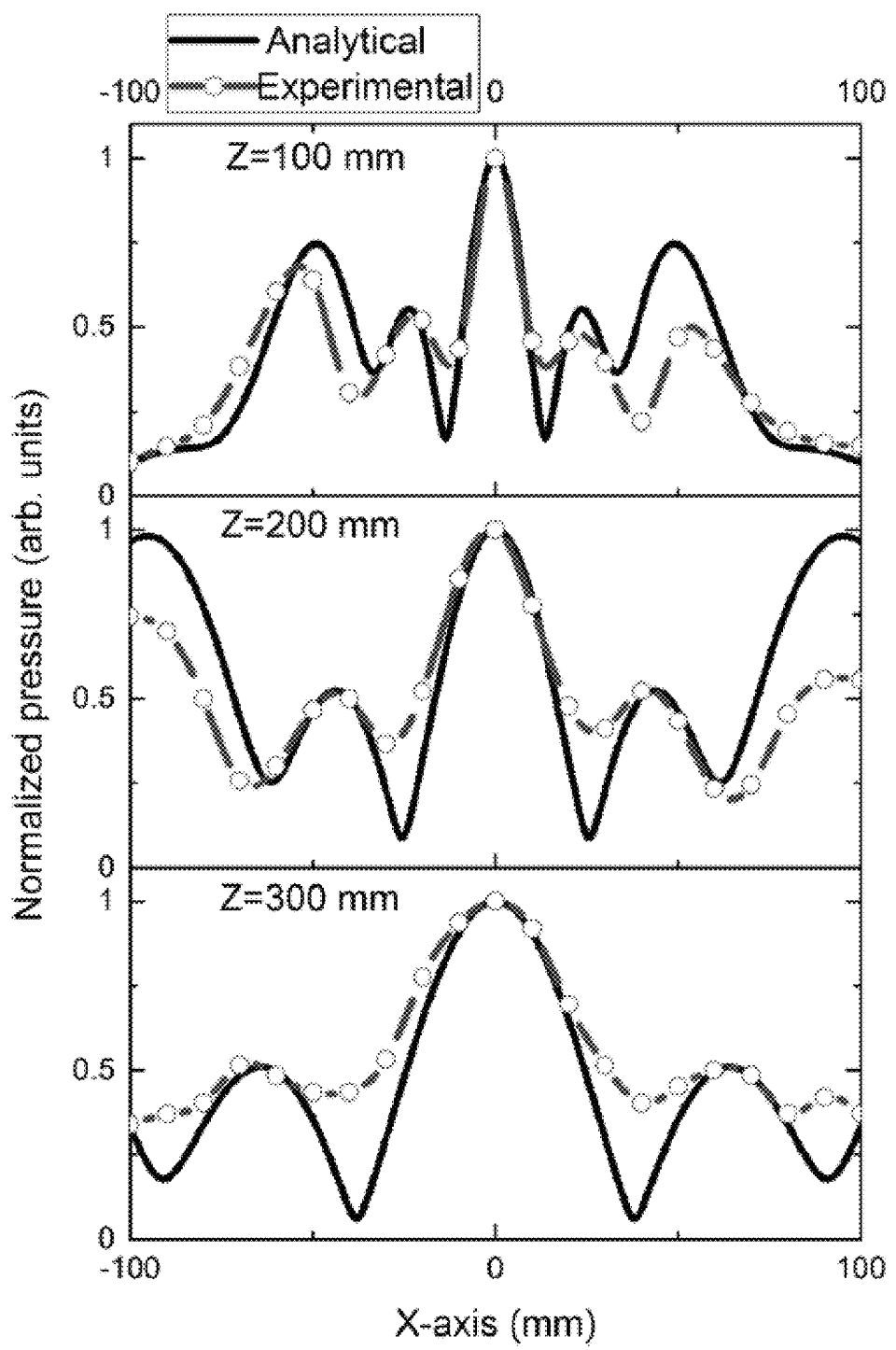
FIG. 17 is a series of graphs showing analytical (e.g., simulated) and experimental transverse beam pressure profiles produced at 182.62 kHz (RM-3) by the piezoelectric disk transducer of Example 2 at a distance of Z=100 mm, 200 mm, and 300 mm from the transducer.

FIG. 17 is a series of graphs showing analytical (e.g., simulated) and experimental transverse beam pressure profiles produced at about 182.62 kHz (RM-3) by the piezoelectric disk transducer of Example 2 at a distance of about Z=100 mm, 200 mm, and 300 mm from the transducer. The peak pressure (e.g., at the center of the beam) is normalized to a value of 1.0. The analytical results are plots of a zeroeth-order Bessel function $J_0(\alpha r)$, where $\alpha$=346.15 m 1 and r is the radial coordinate on the disk. The experimental results agree closely with the analytical results in the peak shapes and relative intensities of the peaks, demonstrating that a Bessel beam is produced by the transducer.

Figure 18:
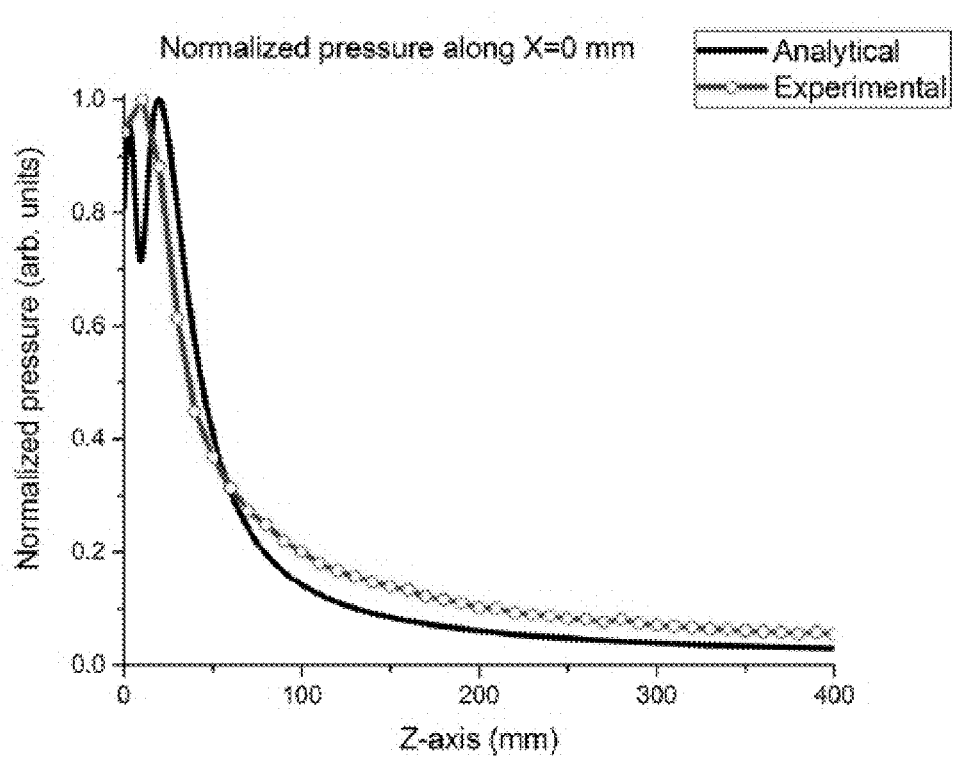
FIG. 18 is a graph showing the corresponding axial pressure profile for the piezoelectric disk transducer of Example 2 when driven at RM-3, i.e. the pressure produced at the center of the beam as a function of distance from the transducer (normalized to a maximum value of 1)

FIG. 18 is a graph showing the corresponding axial pressure profile for the piezoelectric disk transducer of Example 2 when driven at RM-3, i.e. the pressure produced at the center of the beam as a function of distance from the transducer (normalized to a maximum value of 1). The pressure decreases exponentially with increasing distance from the transducer in both the analytical and experimental results.

Example 3

A piezoelectric transducer was prepared according to the method of Example 2. The piezoelectric transducer was mechanically constrained at its radial perimeter by attaching it to the inside of a poly(methyl methacrylate) (PMMA, trade name Plexiglas) cylinder having an outer diameter of about 60 mm, an inner diameter of about 52 mm, and a height (thickness) of about 50 mm, using epoxy as an adhesive (bonding material). Further experimental details can be found in Chillara et al., "Low-frequency ultrasonic Bessel-like collimated beam generation from radial modes of piezoelectric transducers", *Appl. Phys. Lett.*, 2017, 110, 064101, the entire content of which is incorporated herein by reference.

Figure 19A:
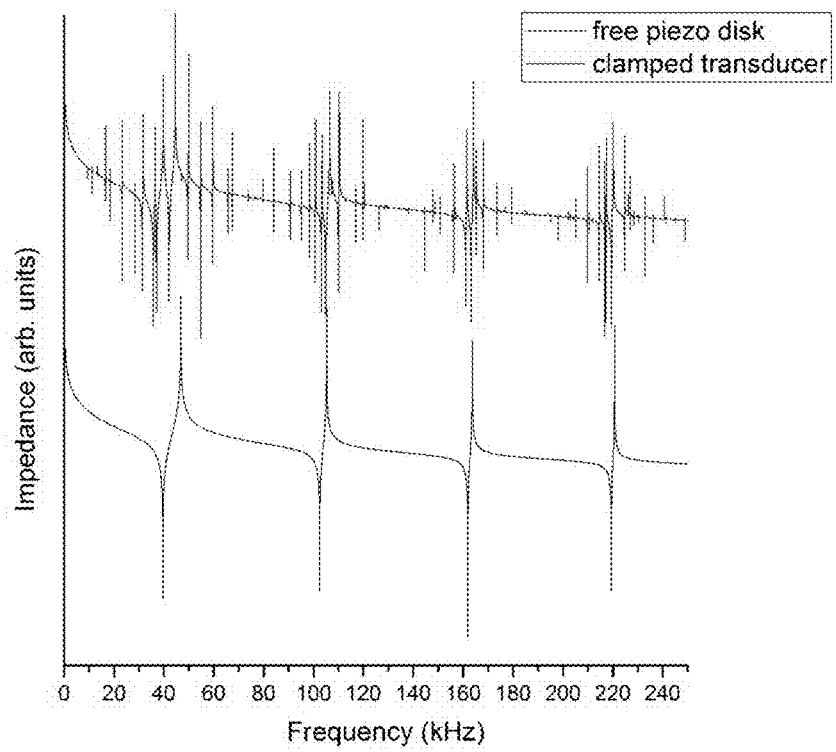
FIG. 19a is a graph comparing the simulated resonance impedance spectra of a free piezo disk (e.g., the piezoelectric transducer of Example 2) and a clamped transducer (e.g., the piezoelectric transducer of Example 3)
Figure 19B:
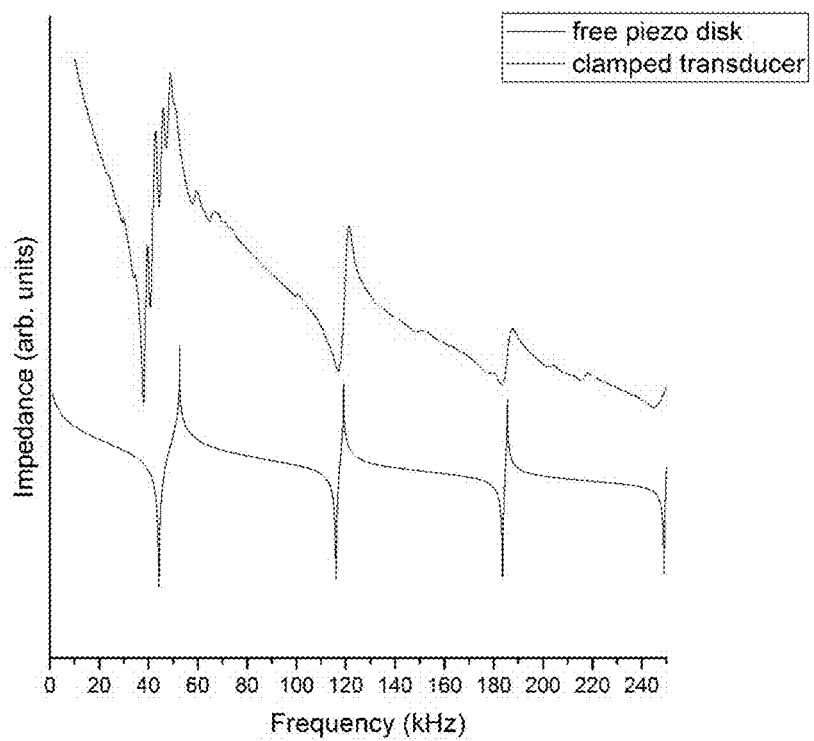
FIG. 19b is a graph comparing the experimental resonance impedance spectra of a free piezo disk (e.g., the piezoelectric transducer of Example 2) and a clamped transducer (e.g., the piezoelectric transducer of Example 3)

The effect of clamping the piezoelectric transducer was studied. FIGS. 19*a*-19*b* are graphs comparing the simulated (e.g., theoretical) and experimental resonance impedance spectra, respectively, of a free transducer (e.g., the piezoelectric transducer of Example 2, lower black lines) and a clamped transducer (e.g., the piezoelectric transducer of Example 3, upper blue lines). In both the simulated and experimental results, the clamped piezoelectric transducer of Example 3 shows additional resonance peaks compared to the free piezoelectric transducer of Example 2. This increase in fine structure indicates that clamping the transducer results in the transducer exhibiting several resonances at lower frequencies. The additional modes of the piezoelectric transducer of Example 3 may therefore enable a broader and lower frequency operating range.

Comparing FIGS. 19a and 19b reveals that not all the theoretically calculated additional modes of the piezoelectric transducer of Example 2 are experimentally observed, especially at higher frequencies. This may be at least partly due to attenuation of vibrations in the PMMA cylinder, the effect of which is larger at higher frequencies. The attenuation of vibrations may be affected by the use of a different material for the cylindrical or ring enclosure (e.g., having a different stiffness, density, mass, etc.).

Figure 20:
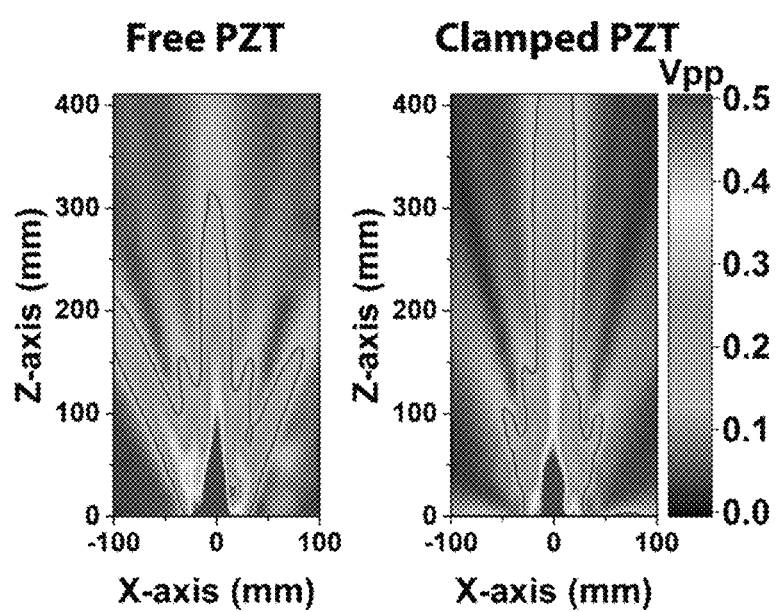
FIG. 20 is a pair of images representing the experimentally determined beam profiles generated in water for the free and clamped piezoelectric transducers of Examples 2 and 3, respectively, at RM-3. The color gradient scale ranges through the visible spectrum from blue to red to denote increasing amplitudes above 0, and the magenta contour line traces the sound wave (beam) at a peak-to-peak voltage ($V_{P-P}$)=1.5 V.

FIG. 20 is a pair of images representing the experimentally determined beam profiles generated in water for the free and clamped piezoelectric transducers of Examples 2 and 3, respectively, at RM-3. Again, the color gradient scale ranges through the visible spectrum from blue to red to denote increasing amplitudes above 0. The magenta contour line traces the sound wave (beam) at a peak-to-peak voltage ($V_{P-P}$)=1.5 V. The free transducer on the left again produces multiple side lobes extending diagonally from the main beam, while the clamped transducer on the right produces fewer and weaker such side lobes. Furthermore, the clamped transducer propagates further along the z-axis than the free transducer, due to reductions in side lobe energy losses.

Example 4 (Computational Example

A piezoelectric transducer having a diameter of about 50 mm and a thickness of about 2.1 mm (similar to Example 2) was simulated using COMSOL Multiphysics (COMSOL AB, Stockholm, Sweden) as an axisymmetric PZT-5A (p=7750 kg/m$^3$) disk laterally attached to a spring. The spring was modeled with varying force constant $k=k_{radial}=k_{axial}$ (units of N/m$^2$). In the model, k=0 corresponds to a free disk, and k=0 corresponds to an ideally clamped disk. Here, the term "ideally clamped" refers to a condition in which the edge of the disk is constrained to undergo substantially no movement. The electrodes are modeled as an electric potential boundary condition on the top and bottom faces of the disk. Further experimental details, such as equations, can be found in Chillara et al., "Radial modes of laterally stiffened piezoelectric disc transducers for ultrasonic collimated beam generation", *J. Wave Motion*, 2017.07.005, the entire content of which is incorporated herein by reference.

Figure 21A:
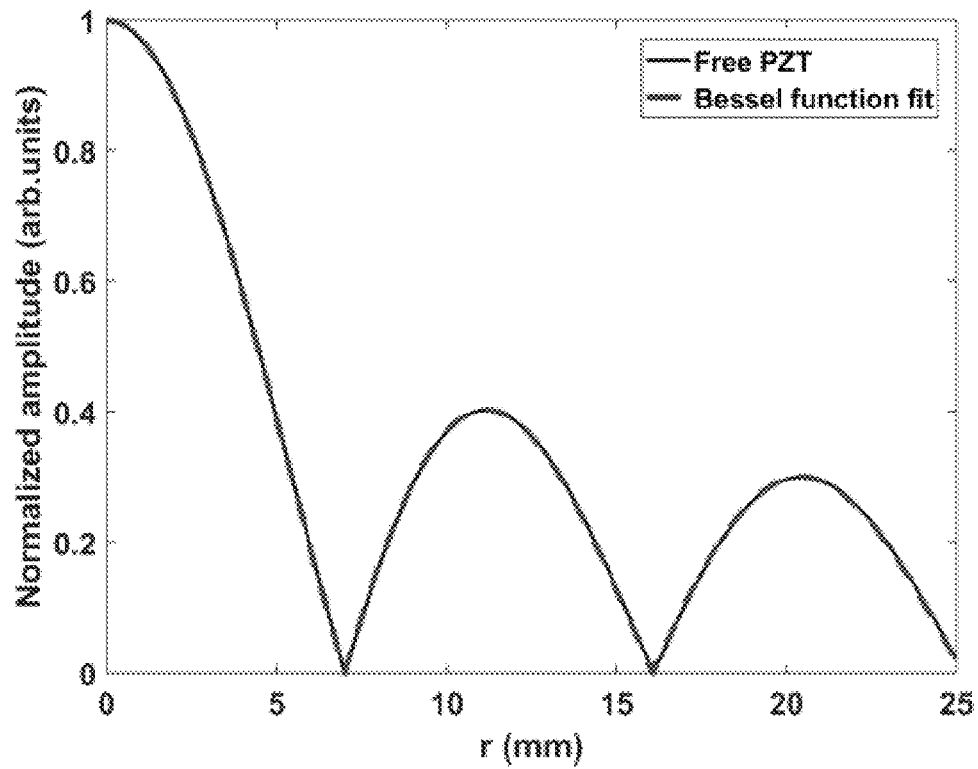
FIGS. 21a and 21b are graphs showing the simulated normalized out-of-plane vibration amplitudes of free and clamped piezoelectric transducer disks according to Example 4 at RM-3 (blue trace) compared to a plot of the corresponding zeroeth-order Bessel function $J_0$ (red trace)
Figure 21B:
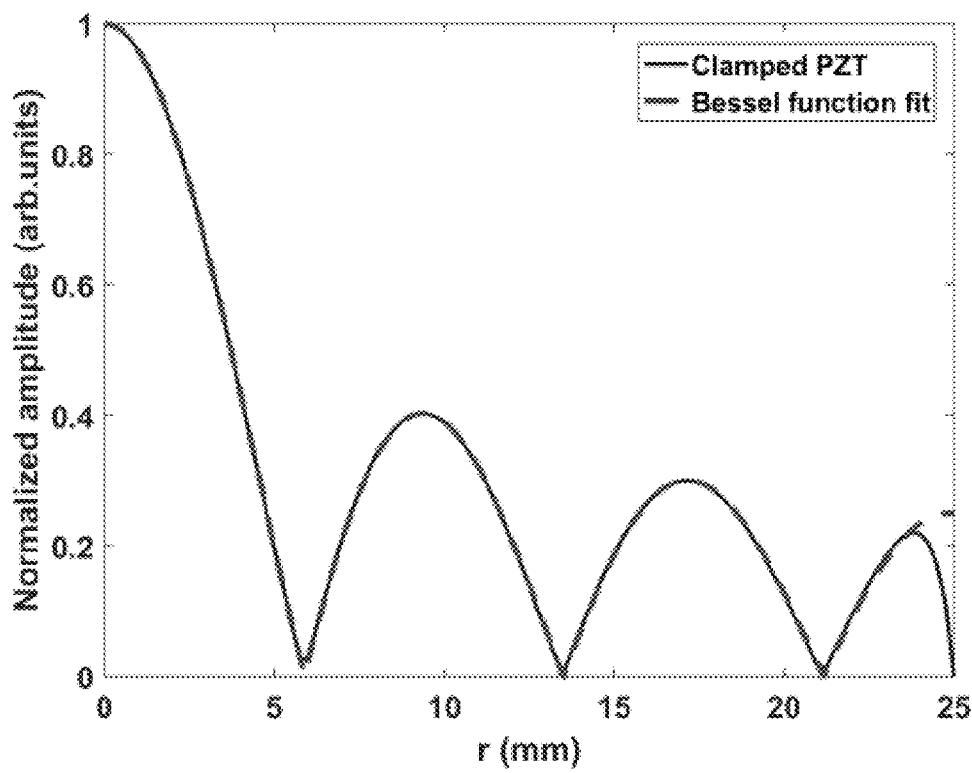

FIGS. 21a and 21b are graphs showing the simulated normalized out-of-plane vibration amplitudes of free and clamped piezoelectric transducer disks according to Example 4 at RM-3. The simulation (blue trace) shows close agreement with a plot of the corresponding zeroeth-order Bessel function $J_0(\alpha r)$, where $\alpha$=343.54 m$^{-1}$ from the free transducer, $\alpha$=343.54 m$^{-1}$ from the clamped transducer and r is the radial coordinate on the disk. While the free transducer of FIG. 21a produces a vibration pattern substantially similar to the corresponding Bessel function, the clamped transducer of FIG. 21b exhibits an edge effect in that the vibration amplitude deviates sharply from the corresponding Bessel function and drops to zero at the edges of the disk. The clamped transducer is shown to have an additional vibrational lobe (peak) compared to the free transducer, such that the central peak is narrower. Furthermore, the amplitude decrease from the central beam to the outer lobes is steeped in the clamped transducer. The effect of clamping on the vibration pattern of the disk transducer agrees with the experimentally obtained beam profile obtained from the transducer of Example 3.

Figure 22:
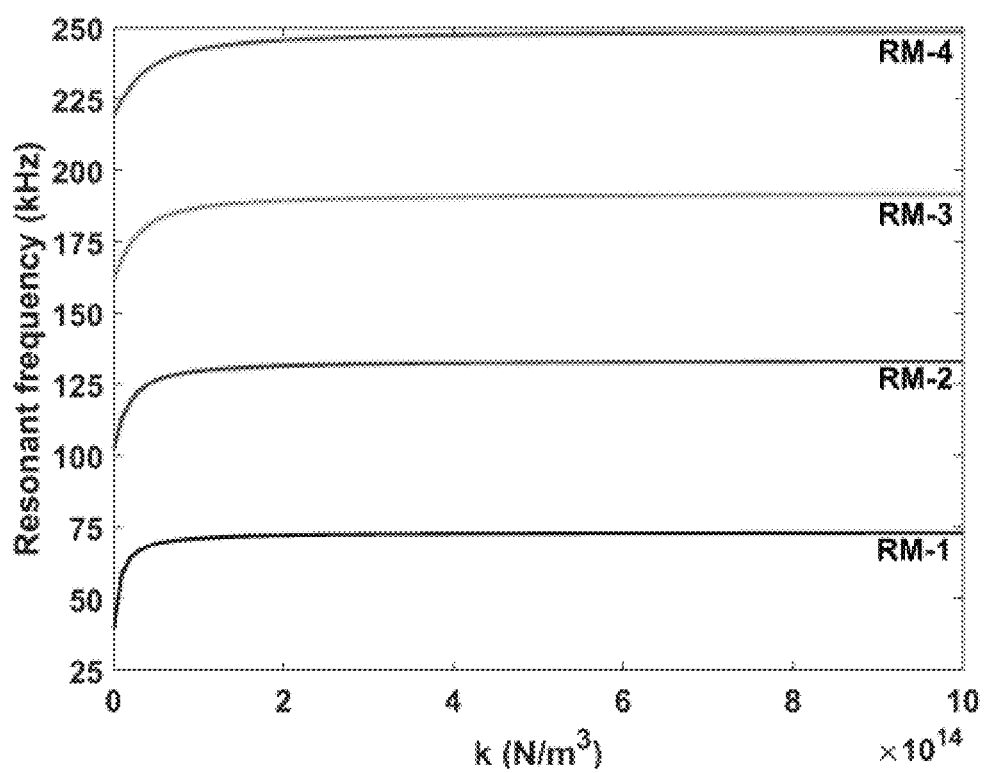
FIG. 22 is a series of graphs showing the effect of varying k between k=0 and $k=10^{14}$ on the first four radial mode frequencies (RM-1 to RM-4) of free and clamped piezoelectric transducer disks according to Example 4.

The effect of clamping strength (clamping efficiency) on the transducer disk was studied to better account for experimental deviations from an ideally clamped disk. FIG. 22 is a series of graphs showing the effect of varying k between k=0 and k=10$^{14}$ on the first four radial mode frequencies (RM-1 to RM-4) of a clamped disk. At k=0 (y-axis intercept), the radial mode frequencies are equivalent to those calculated for the free disk. As k increases and approaches 10$^{14}$, the predicted radial mode frequency asymptotically approaches the value calculated for the clamped disk, with the rate of increase being the fastest for RM-1. The steep rise of the curves suggests that a small increase in lateral stiffness (e.g., clamp strength) should be sufficient to produce radial mode frequency changes on par with the ideally clamped disk. In contrast, the edge (E), thickness shearing (TS), and thickness extensional (TE) modes were found to be largely unaffected by clamping in disks having a D/T radio >20.

Figure 23:
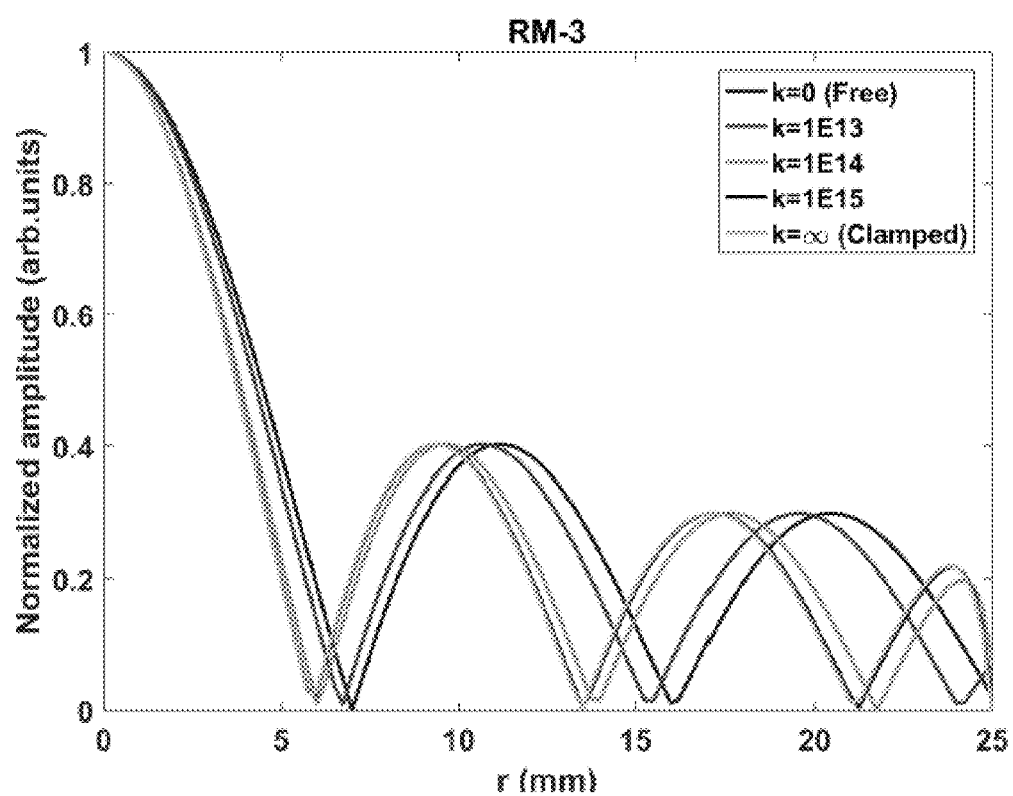
FIG. 23 is a graph showing the simulated normalized out-of-plane RM-3 vibration amplitudes of the piezoelectric transducer disk of Example 4 with varying k (e.g., k=0 (blue trace), $k=10^{13}$ (red trace), $k=10^{14}$ (green trace), $k=10^{15}$ (black trace), and k=0 (lime trace))

FIG. 23 is a graph showing the simulated normalized out-of-plane RM-3 vibration amplitudes of the piezoelectric transducer disk of Example 4 with varying k. (e.g., k=0, k=10$^{13}$, k=10$^{14}$, k=10$^{15}$, and k=0, where k=0 to 10$^{14}$ are within the left section of the curve of FIG. 22). FIG. 23 illustrates the shift in vibration pattern toward a curve resembling that shown in FIG. 21b as the disk approaches ideal clamping (k=0).

Figure 24:
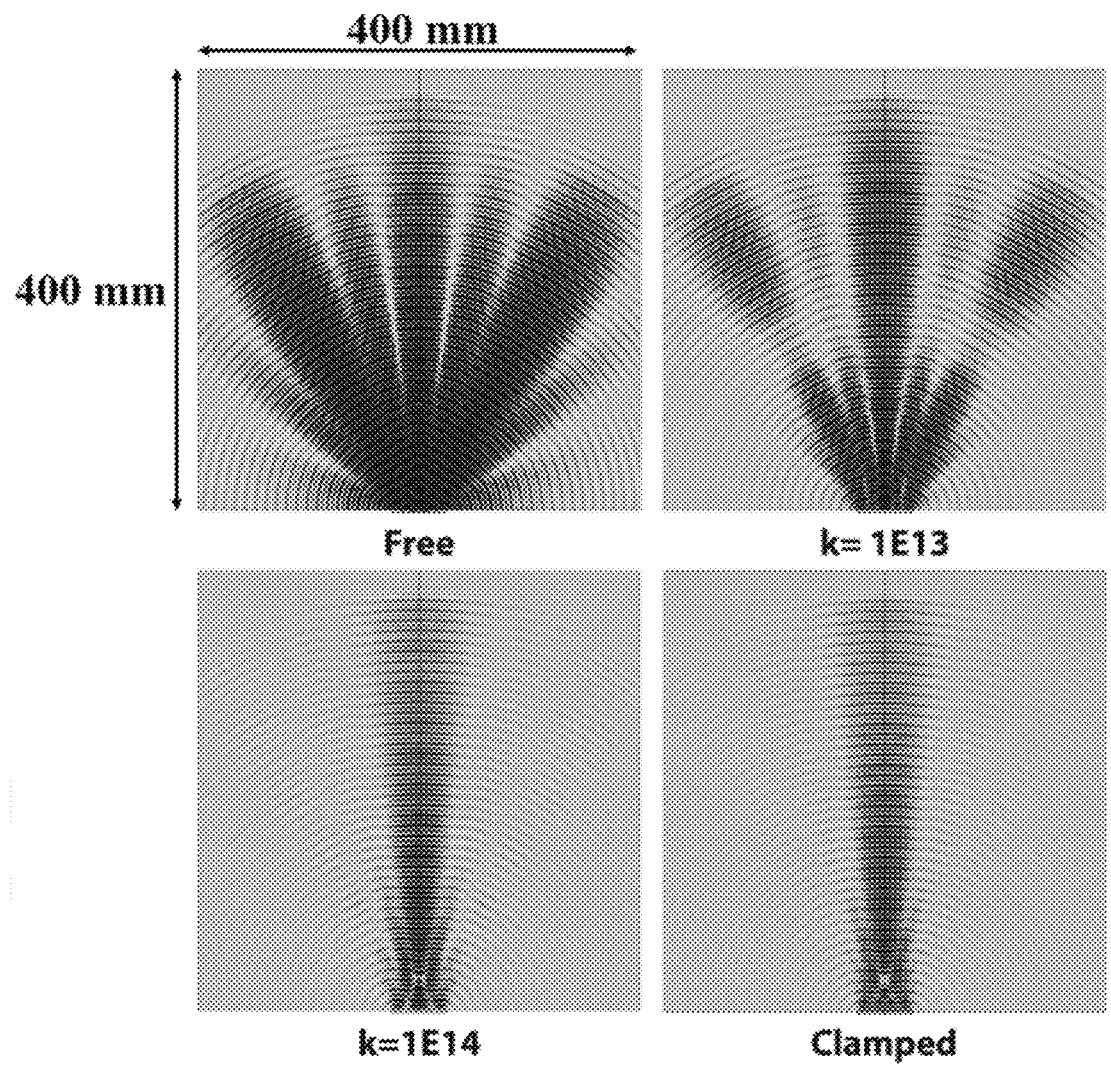
FIG. 24 is a series of images showing simulated beam profile images for the piezoelectric transducer disk of Example 4 with varying k. (e.g., k=0, $k=10^{13}$, $k=10^{14}$, and k=0)

FIG. 24 is a series of images showing simulated beam profile images for the piezoelectric transducer disk of Example 4 with varying k. (e.g., k=0, k=10$^{13}$, k=10$^{14}$, and k=). In each image, the main beam is centered at x=0 and extends vertically along the z-axis. The free transducer on the top left produces multiple side lobes extending diagonally from the main beam, which correspond to the side lobes in, e.g., FIG. 17. In contrast, the clamped transducers of the other images have fewer side lobes, with the clamped (k=0) having the least prominent (e.g., shortest propagation) side lobes and thereby the most collimated beam.

Figure 25A:
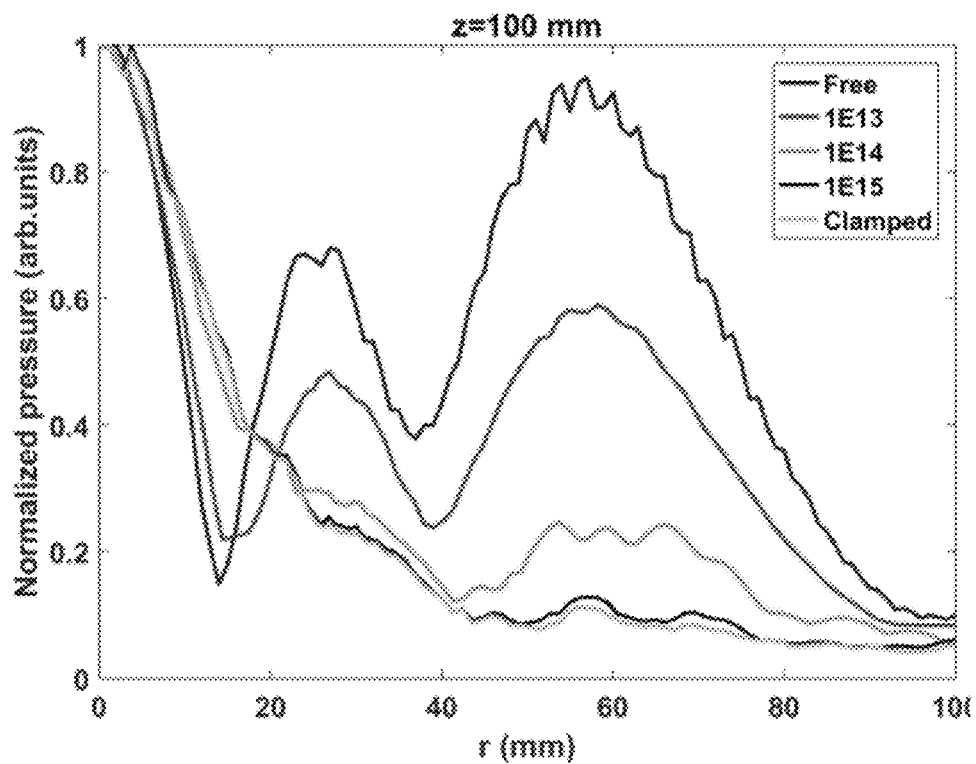
FIG. 25a is a graph showing simulated transverse beam pressure profiles (similar in content to the experimental results shown in FIG. 17, except that only one side of the axisymmetric profile is shown) produced at 161.8 kHz (RM-3) at a distance of z=100 mm from the piezoelectric disk transducer of Example 4 with varying k (e.g., k=0 (blue trace), $k=10^{13}$ (red trace), $k=10^{14}$ (green trace), $k=10^{15}$ (black trace), and k=(lime trace))

FIG. 25a is a graph showing simulated transverse beam pressure profiles (similar in content to the experimental results shown in FIG. 17, except that only one side of the axisymmetric profile is shown) produced at about 161.8 kHz (RM-3) at a distance of z=100 mm from the piezoelectric disk transducer clamped with varying k (e.g., k=0 (blue trace), k=10$^{13}$ (red trace), k=10$^{14}$ (green trace), k=10$^{15}$ (black trace), and k=0 (lime trace)). The peak pressure (e.g., at the center of the beam) is normalized to a value of 1.0 in each plot.

Figure 25B:
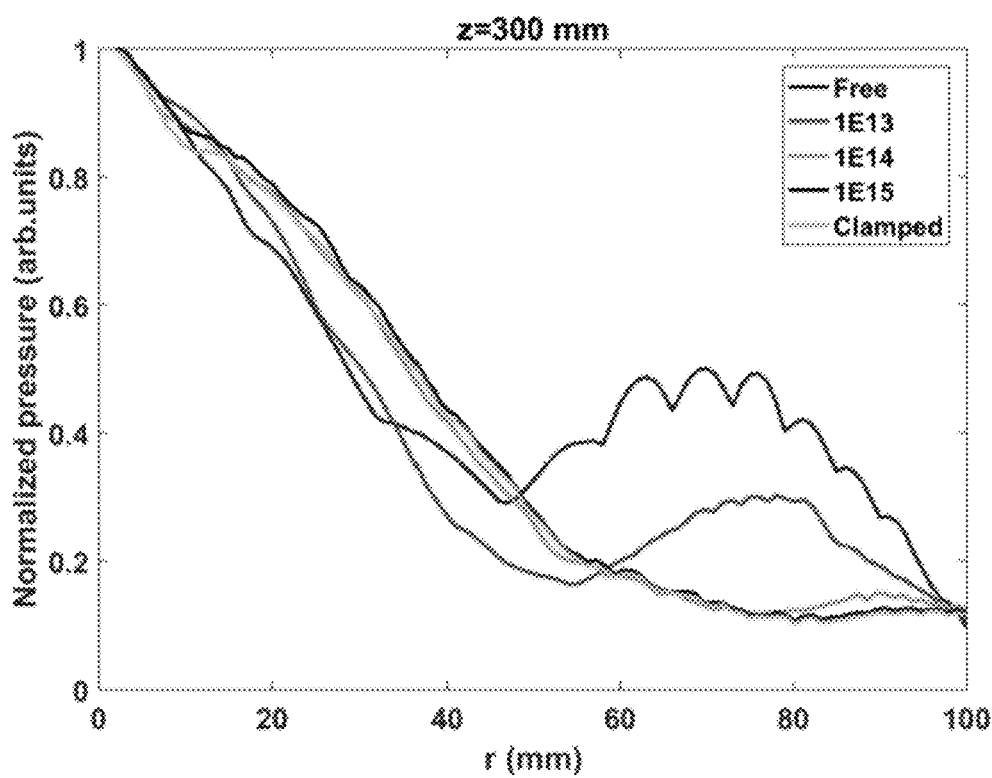
FIG. 25b is a graph showing the corresponding simulated transverse beam pressure profiles at a distance of z=300 mm.

FIG. 25b is a graph showing the corresponding simulated transverse beam pressure profiles at a distance of about z=300 mm. In both of FIGS. 25a and 25b, the free disk (k=0) shows significant side lobe amplitudes, but these amplitudes decrease with increasing k. The decrease appears to quickly reach a maximum threshold, in agreement with FIG. 22. The beam width is increased in FIG. 25b relative to that in FIG. 25a, indicating some beam spreading as the propagation distance increases. However, as discussed in connection with FIG. 21, the overall propagation distance and degree of collimation of the beam is increased in the highly clamped case.

FIG. 26 is a graph showing the simulated axial pressure profile, i.e. the pressure produced at the center of the beam as a function of distance from the transducer when driven at RM-3 (similar in content to the experimental results shown in FIG. 18) for varying k as in FIGS. 25a and 25b. All simulations show fluctuation in the near-field response. FIG. 26 shows that when k=0 (blue trace) or 10$^{13}$ (red trace), the pressure subsequently decays monotonically as the distance from the transducer increases. However, when the lateral stiffness of the transducer is increased (e.g., through clamping), a secondary hump appears between about 50 mm to about 100 mm. Furthermore, the pressure amplitude appears to decay at an slower rate. Without being bound by the correctness of any particular mechanism or theory, it is believed that the energy from the side lobes may be redirected into the central lobe as the beam propagates further along the axial direction (z-axis, as shown in FIG. 14).

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The device and/or any other relevant devices or components according to embodiments of the present invention described herein may be implemented utilizing any suitable hardware, firmware (e.g. an application-specific integrated circuit), software, or a combination of software, firmware, and hardware. For example, the various components of the [device] may be formed on one integrated circuit (IC) chip (e.g., a custom-designed ASIC—application specific integrated circuit) or on separate IC chips. Further, the various components of the [device] may be implemented on a flexible printed circuit film, a tape carrier package (TCP), a printed circuit board (PCB), or formed on one substrate. Further, the various components of the [device] may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the drawings, it will be understood by those of ordinary skill in the art that various changes in form and details may be made therein without departing from the spirit and scope as defined by the following claims and equivalents thereof.

What is claimed is:

1. A method of producing a highly collimated sound beam substantially free of side lobes at frequencies below 1 MHz, the method comprising:
   applying a radially-inward force to a perimeter of a flat disk piezoelectric transducer by embedding the flat disk piezoelectric transducer into one of two open ends of a hollow cylinder, the radially-inward force altering a vibration pattern of the flat disk piezoelectric transducer; and
   applying a uniform electric field to the flat disk piezoelectric transducer via two flat disk electrodes on two faces of the flat disk piezoelectric transducer, the uniform electric field exciting the flat disk piezoelectric transducer at one or more radial mode excitation frequencies below 1 MHz to generate a radial mode vibration and a deformation along a thickness direction of the flat disk piezoelectric transducer that produces the highly collimated sound beam substantially free of side lobes due to the radially-inward force.

2. The method of claim 1, wherein the hollow cylinder comprises poly(methyl methacrylate) and is glued to the perimeter of the flat disk piezoelectric transducer.

3. The method of claim 1, wherein the one or more radial mode excitation frequencies are about 79 kHz to about 1 MHz.

4. The method of claim 3, wherein the one or more radial mode excitation frequencies are about 79 kHz to about 182 KHz.

5. The method of claim 1, wherein the one or more radial mode excitation frequencies are spaced apart by about 10 Hz to 300 Hz.

6. The method of claim 1, wherein the second face of the flat disk piezoelectric transducer is exposed at a planar outer surface of the hollow cylinder.

7. The method of claim 1, wherein the radially-inward force alters the vibration pattern of the flat disk piezoelectric transducer to include at least one additional resonance peak.

8. A device for sound imaging at frequencies below 1 MHz, the device comprising:
   a hollow cylinder having two open ends;
   a piezoelectric transducer embedded in one of the two open ends of the hollow cylinder, the piezoelectric transducer comprising:
      a flat, circular disk comprising a piezoelectric material; and
      a single flat disk electrode on each face of the circular disk; and
   a waveform generator configured to uniformly excite the piezoelectric transducer, via the two flat disk electrodes, with a uniform electric field,
   wherein the cylinder applies a radially-inward force to a perimeter of the flat, circular disk, the radially-inward force altering a vibration pattern of the flat, circular disk in response to the uniform electric field, and
   wherein the piezoelectric transducer vibrates in a radial mode vibration and deforms along a thickness direction in response to the uniform electric field having one or more radial mode excitation frequencies below 1 MHz to produce a highly collimated sound beam substantially free of side lobes due to the radially-inward force.

9. The device of claim 8, wherein the circular disk has a diameter/thickness ratio of about 5 to about 50.

10. The device of claim 8, wherein the circular disk is made of lead zirconium titanate.

11. The device of claim 8, further comprising an adhesive layer between the piezoelectric transducer and the hollow cylinder.

12. The device of claim 8, wherein the hollow cylinder comprises a metal, an alloy, a glass, a ceramic, a plastic, or a mixture thereof.

13. The device of claim 12, wherein the hollow cylinder comprises poly(methyl methacrylate) and is glued to the perimeter of the piezoelectric transducer.

14. The device of claim 8, wherein the piezoelectric transducer does not include an annular electrode.

15. The device of claim 8, wherein the hollow cylinder comprises a material different than the piezoelectric transducer.

16. The device of claim 8, wherein the radially-inward force alters the vibration pattern of the flat, circular disk to include at least one additional resonance peak.

* * * * *